(12) United States Patent
Yamaguchi et al.

(10) Patent No.: US 7,896,251 B2
(45) Date of Patent: Mar. 1, 2011

(54) MEDIUM PROVIDED WITH MAGNETIC ELEMENT, AND METHOD AND APPARATUS FOR READING INFORMATION FROM SUCH MEDIUM

(75) Inventors: Shoji Yamaguchi, Kanagawa (JP); Mario Fuse, Kanagawa (JP); Kunihiro Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 483 days.

(21) Appl. No.: 11/272,967

(22) Filed: Nov. 15, 2005

(65) Prior Publication Data
US 2006/0227586 A1   Oct. 12, 2006

(30) Foreign Application Priority Data
Mar. 24, 2005   (JP) ............... 2005-086612

(51) Int. Cl.
*G06K 19/06* (2006.01)
(52) U.S. Cl. ...................... 235/493; 235/449
(58) Field of Classification Search ............ 235/449; 399/366; 283/82; 324/200–263
See application file for complete search history.

(56) References Cited

U.S. PATENT DOCUMENTS

| 4,114,032 | A | * | 9/1978 | Brosow et al. ............ 235/493 |
| 4,940,966 | A | * | 7/1990 | Pettigrew et al. ........... 340/551 |
| 5,382,963 | A | * | 1/1995 | Pond et al. ................. 346/25 |
| 5,420,569 | A | * | 5/1995 | Dames et al. .............. 235/493 |
| 5,614,278 | A | * | 3/1997 | Chamberlain et al. ...... 428/41.4 |
| 5,685,952 | A | * | 11/1997 | Owen ........................ 162/4 |
| 5,756,220 | A | * | 5/1998 | Hoshino et al. .......... 428/537.5 |
| 5,821,859 | A | * | 10/1998 | Schrott et al. ............ 340/572.6 |
| 5,965,214 | A | * | 10/1999 | Crossfield et al. .......... 427/547 |
| 5,974,150 | A | * | 10/1999 | Kaish et al. ................ 713/179 |
| 2004/0066522 | A1 | * | 4/2004 | Yamaguchi et al. ......... 235/493 |
| 2004/0207528 | A1 | * | 10/2004 | Fabian et al. ............ 340/572.6 |

FOREIGN PATENT DOCUMENTS

| JP | A 05-219351 | 8/1993 |
| JP | A-11-073486 | 3/1999 |
| JP | A 2001-159094 | 6/2001 |
| JP | A-2004-288004 | 10/2004 |

OTHER PUBLICATIONS

Japanese Office Action dated Nov. 4, 2009 for Japanese Patent Application No. 2005-086612 (with English language translation).

* cited by examiner

*Primary Examiner*—Thien M. Le
*Assistant Examiner*—Christle I Marshall
(74) *Attorney, Agent, or Firm*—Oliff & Berridge, PLC

(57) ABSTRACT

An information reading apparatus has an excitation unit that applies a magnetic field to a medium provided with at least one magnetic element that generates a signal when the magnetic field is applied thereto and a pseudo element that generates no signal when the magnetic field is applied thereto; a detection unit that detects a signal when the signal is generated; and an identification unit that identifies the medium based on a result of the detection.

12 Claims, 17 Drawing Sheets

IDENTIFICATION INFORMATION: 100

IDENTIFICATION INFORMATION: 010

IDENTIFICATION INFORMATION: 001

CONVEYANCE DIRECTION OF PRINTED PAPER SHEET

IDENTIFICATION INFORMATION:

MEDIUM PROVIDED WITH MAGNETIC ELEMENT, AND METHOD AND APPARATUS FOR READING INFORMATION FROM SUCH MEDIUM

BACKGROUND OF THE INVENTION

1. Field of the Invention

The present invention relates to a medium provided with magnetic element, and a method and apparatus for reading information from such medium. In particular, the present invention relates to a medium that is provided with identification information indicated by at least one type of magnetic elements, and a method and apparatus for reading the identification information of the medium based on a detection result of a signal that is generated by the magnetic element when a predetermined magnetic field is applied to the magnetic element, while making it difficult to identify the identification information of the medium by visual observation.

2. Description of the Related Art

Recently, various security-enhancing methods and apparatuses have been proposed to prevent leakage of confidential or personal information and fraudulent copying or forgery of securities or other instruments.

For example, a method has been proposed for preventing forgery of securities or other instruments. According to the method, the forgery of securities or other instruments is prevented by preparing securities or other instruments on a special paper having a latent image of a specific pattern or formed with a special ink containing an infrared ray absorption agent.

In this method, if a security or other instruments prepared on the special paper is copied by a scanner (image reading apparatus) or a copier, the latent image of a specific pattern formed on the special paper with special ink is printed as a visually observable image, whereby the document thus obtained can be identified as a copied one and thus forgery can be prevented.

In addition to the above method, forgery preventing paper and securities prepared on such paper, which are extremely difficult to forge by using a color copier or the like is known. Also, an image processing apparatus and method, in which, if a specific original document is copied, a specific pattern is always added to the copy is known.

The forgery preventing paper is produced by dispersing, in a paper base made of pulp fibers, a mixture of substantially equal amounts of small pieces of paper or fiber fibrils coated with an ink containing a metameric pigment, and small pieces of paper or fiber fibrils colored with an ordinary ink of a color that appears to be the same hue as the ink containing the metameric pigment under ordinary light such as sunlight. Accordingly, when a security prepared on the forgery preventing paper is color-copied, two types of spots having different hues will appear on the copy, and thus the forgery can be prevented.

Also, an image from an original document is combined with an image from a transfer material to determine the specificity of the original document, and an output image of the original document having the specificity is always processed before being output, so that if a specific original document that is not supposed to be copied (e.g., a banknote) is copied, a trail can be obtained to find the location of the copier used for the copying.

However, according to the technology described above, the fact of copying is identified either by detecting a specific pattern which is added to a paper sheet when image information on the sheet is copied and printed out, or by adding a specific pattern to a paper sheet and detecting the same.

Therefore, neither of these conventional techniques has satisfied a demand for forgery preventing paper, or a method and apparatus, which can prohibit the copying, or determine whether an original document is a specific one or not, instantaneously without scanning the paper.

Further, according to the conventional method in which a specific pattern added onto a paper sheet is detected by optically scanning the sheet, the specific pattern may be erroneously detected if a region where the pattern is formed is contaminated or stained. Therefore, there is a demand for a more reliable apparatus or method which is capable of preventing the fraudulent copying by accurately identifying noncopiable information added to a sheet without being affected by such contamination or stains.

SUMMARY OF THE INVENTION

According to an aspect of the present invention, an information reading apparatus comprises an excitation unit that applies a magnetic field to a medium provided with at least one magnetic element that generates a signal when the magnetic field is applied thereto and a pseudo element that generates no signal when the magnetic field is applied thereto; a detection unit that detects a signal when the signal is generated; and an identification unit that identifies the medium based on a result of the detecting.

According to another aspect of the present invention, an information reading method comprises providing a medium with at least one magnetic element that generates a signal when a magnetic field is applied thereto and a pseudo element that generates no signal when the magnetic field is applied thereto; applying the magnetic field to the medium; and reading information formed by the magnetic element provided in the medium when the signal generated by the magnetic element is detected.

According to still another aspect of the present invention, a medium comprises at least one magnetic element that generates a signal when a magnetic field is applied thereto; a pseudo element that generates no signal when the magnetic field is applied thereto; wherein the magnetic element is mixed with the pseudo elements in the medium.

BRIEF DESCRIPTION OF THE DRAWINGS

Embodiment of the present invention will be described in detail based on the following figures, wherein.

DETAILED DESCRIPTION OF THE INVENTION

A medium provided with magnetic element, and a method and apparatus for reading information from such medium according to the present invention are applicable to, for example, a printer and a copier for the purpose of preventing fraudulent copying and forgery of securities or other instruments, or preventing leakage of confidential information or personal information caused by fraudulent copying of a paper sheet containing such information, or for the purpose of document management.

When the present invention is applied to a printer, the printer can be used as a printer capable of document management by using special purpose paper provided with identification information for identifying the specificity of the paper, indicated by magnetic elements, as paper for printing the information and managing the identification information of the special purpose paper in association with the information printed on the special purpose paper.

When the present invention is applied to a copier, if an attempt is made to copy confidential information under management, or securities or other instruments, the copier is able to prohibit the copying operation by detecting the magnetic element provided in the special purpose paper on which the confidential information is printed or on the securities or other instruments. Thus, it is possible to prevent leakage of confidential information or forgery of securities or other instruments through fraudulent copying thereof.

Embodiment of the invention will be described below by way of example in which a medium provided with identification information indicated by magnetic elements and a method and apparatus for reading the information from such medium are applied to a copier.

Description of embodiment of the present invention will now be made with reference to the accompanying drawings in which a medium provided with magnetic elements and a method and apparatus for reading information from such medium are applied to a copier.

Figure 1A:
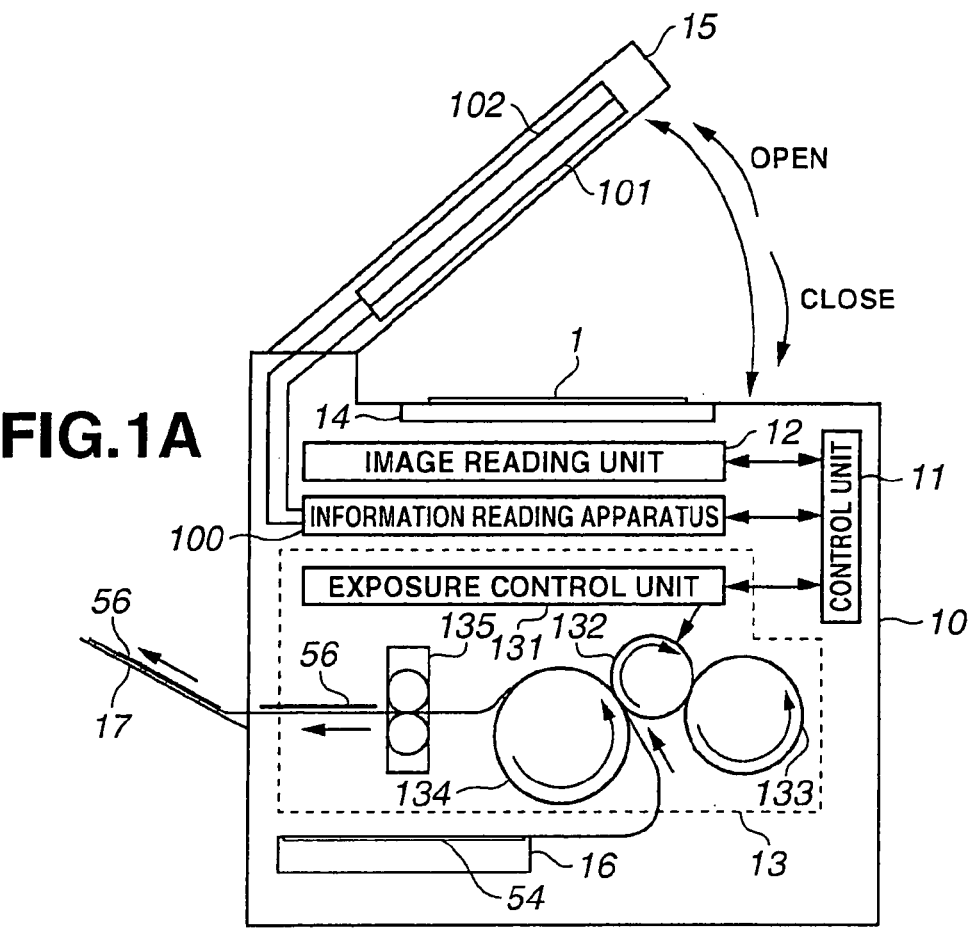
FIGS. 1A and 1B are schematic diagrams illustrating a copier 10 provided with an information reading apparatus 100 according to an embodiment of the present invention.
Figure 1B:
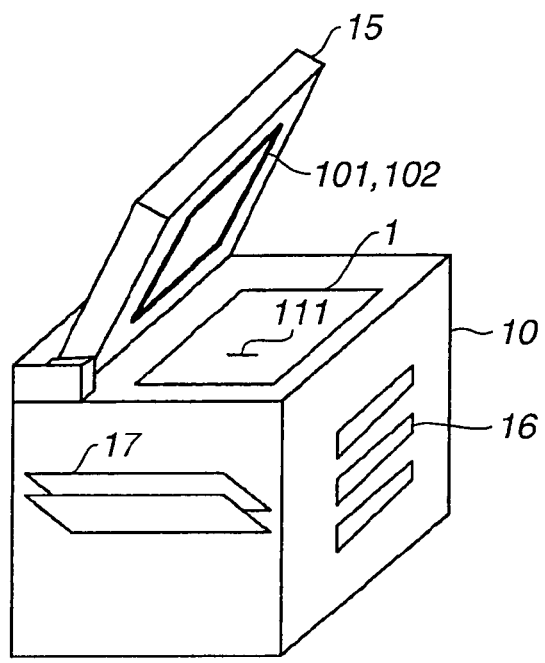

FIGS. 1A and 1B are schematic diagrams illustrating a copier 10 provided with an information reading apparatus 100 according to the present invention, in which FIG. 1A is a block diagram schematically illustrating the copier 10, and FIG. 1B is a schematic perspective view of the copier 10.

As shown in FIGS. 1A and 1B, the copier 10 comprises an information reading apparatus 100, a control unit 11, an image reading unit 12, and an image formation unit 13. The information reading apparatus 100 detects a magnetic element 111 that is provided in an original document 1 placed on a platen glass 14 of the copier 10 to identify information indicating whether the original document 1 is copiable or not copiable. The control unit 11 performs overall control of the copier 10 to prohibit the copier 10 from copying the original document 1 based on a detection result of the information reading apparatus 100, or to control the copying operation thereof. The image reading unit 12 applies light to the original document 1 placed on the platen glass 14 so that the light reflected from the original document 1 is received and converted into an electric signal by a photoelectric converter (not shown) such as a charge couple device (CCD). The image reading unit 12 then reads the image information of the original document 1 based on the electric signal thus obtained, and performs predetermined image processing on the image information. The image formation unit 13 prints out the image information of the original document 1 read by the image reading unit 12 on a paper sheet 54 fed from a paper tray 16, and discharges the printed paper sheet to a paper delivery tray 17.

The image formation unit 13 comprises an exposure control unit 131, a development device 133, a transfer drum 134, and a fixing device 135. The exposure control unit 131 performs scanning exposure control of a photoconductor drum 132 by emitting laser light to the photoconductor drum 132 in accordance with output image data that is output after the image information read from the original document 1 by the image reading unit 12 has been subjected to the image processing. The development device 133 forms a toner image by developing, with toners of various colors, a latent image formed on the surface of the photoconductor drum 132 by the scanning exposure control of the exposure control unit 131. The transfer drum 134 transfers the toner image formed on the photoconductor drum 132 by the development device 133. The fixing device 135 fixes the toner image formed on the transfer drum 134 on a paper sheet 54 fed from the paper tray 16.

In the interior of a platen cover 15 of the copier 10, there are provided an exciting coil 101 and a sensing coil 102 of the information reading apparatus 100 for detecting a magnetic element 111 provided in an original document 1 mounted on the platen glass 14. The exciting coil 101 transmits a predetermined alternating magnetic field. The sensing coil 102 receives the alternating magnetic field transmitted by the exciting coil, or a magnetic pulse or electromagnetic waves generated by the magnetic element 111, and identifies identification information indicating whether the original document 1 is copiable or not based on a detection result of the magnetic element 111 provided in the original document 1 by the information reading apparatus 100.

The configuration of the information reading apparatus 100 and the method of detecting the magnetic element 111 provided in the original document 1 will be described later.

A brief description will now be made of the operations of the copier 10 configured in this manner, to detect the identification information indicating whether original document 1 placed on the platen glass 14 is copiable or not, and to perform the processing either for allowing or for prohibiting copying based on the detection result.

When an original document 1 is placed on the platen glass 14 of the copier 10, the platen cover 15 is closed (in the direction indicated by the arrows in FIG. 1A), and a copy start button (not shown) is pressed, the control unit 11 of the copier 10 activates the information reading apparatus 100 prior to copying the original document 1.

Upon the activation of the information reading apparatus 100, a predetermined alternating magnetic field is generated by the exciting coil 101. Receiving this alternating magnetic field, the magnetic element 111 provided in the original document 1 on the platen glass 14 is magnetized and generates a steep magnetic pulse at the reversal of magnetization, or the magnetic element 111 is magnetostrictively vibrated and generates electromagnetic waves by the magnetostrictive vibration.

The magnetic pulse or electromagnetic waves generated by the magnetic element 111 are received by the sensing coil 102. Based on a detection signal that is detected in response to the received magnetic pulse or electromagnetic waves, the information reading apparatus 100 identifies identification information indicating whether the original document 1 is copiable or not copiable.

If a detection signal of a magnetic pulse or electromagnetic waves generated by a magnetic element 111 is detected, it is recognized that the original document 1 has a magnetic element 111 attached thereto, and determined that the original document 1 is not copiable.

If no detection signal of a magnetic pulse or electromagnetic waves generated by a magnetic element 111 is detected, it is recognized that the original document 1 has no magnetic element attached thereto, and is determined that the original document is copiable.

When the information reading apparatus 100 determines that the original document 1 is not copiable, the control unit 11 of the copier 10 performs a control to prohibit the copying operation, while outputting a message "THIS DOCUMENT IS NOT COPIABLE", for example, or alarm sound indicating the prohibition of the copying.

Whereas, when the information reading apparatus 100 determines that the original document 1 is copiable, image information of the original document 1 placed on the platen glass 14 of the copier 10 is read by the image reading unit 12. The image information thus read is printed by the image formation unit 13 on a paper sheet 54 fed from the paper tray 16, and the printed paper sheet is discharged to the paper delivery tray 17.

The information reading apparatus 100 may determine whether the original document 1 is copiable or not, either after placing the original document 1 on the platen glass 14 of the copier 10 or giving instruction to the copier 10 to start copying, or prior to starting the copying. The timing of the determination is not restricted to any specific timing.

The type, number, arrangement position, and shape of the magnetic elements provided in the original document 1 are not restricted specifically. Depending on the identification information of the original document 1 provided for identification of the original document 1, only one magnetic element may be applied, or several types of several magnetic elements may be applied.

Figure 2:
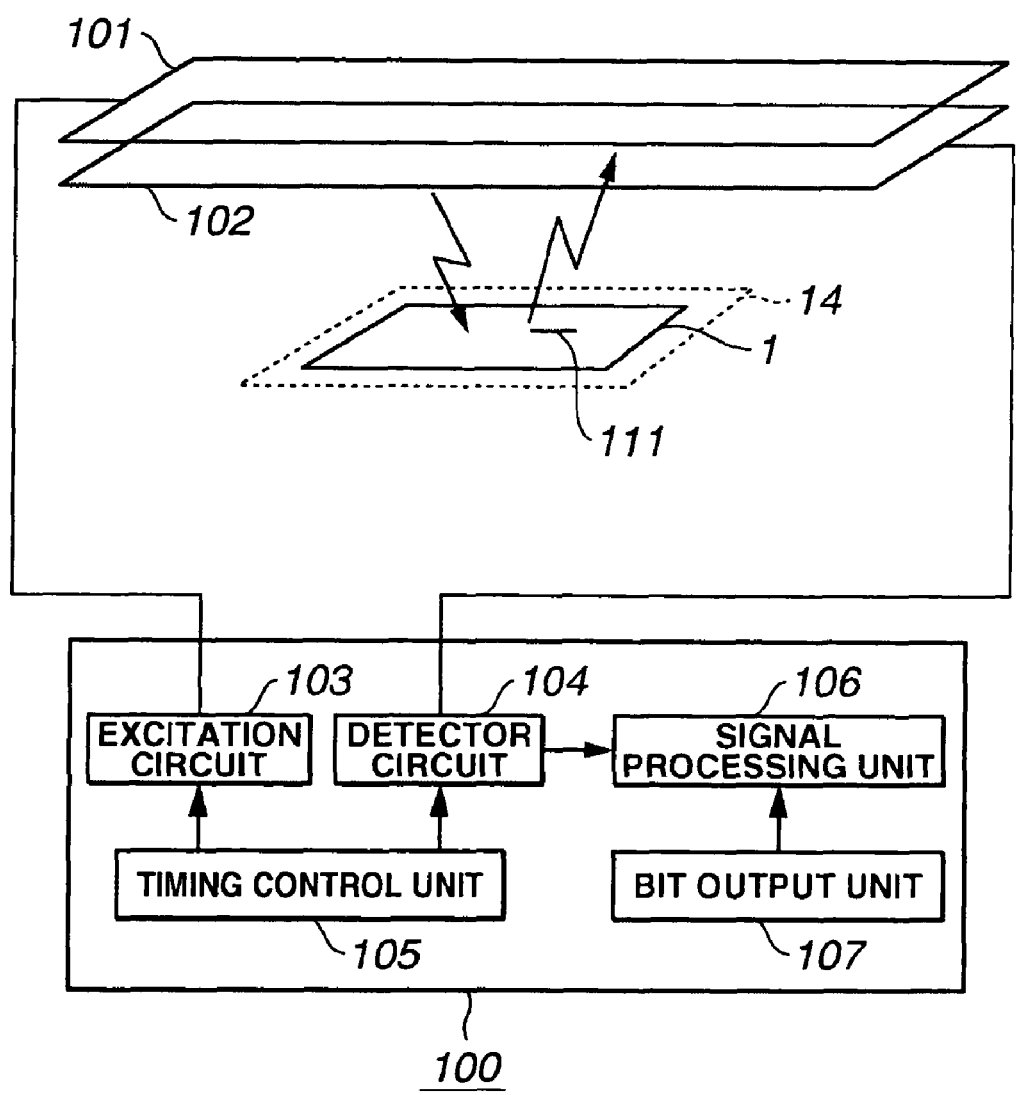
FIG. 2 is a block diagram illustrating a principal part of the information reading apparatus 100.

FIG. 2 is a block diagram illustrating configuration of a principal part of the information reading apparatus 100 according to the invention.

The information reading apparatus 100 shown in FIG. 2 is an information reading apparatus that is applicable to a case in which the magnetic element provided in the original document 1 generates a steep magnetic pulse at the reversal of magnetization, when receiving a predetermined magnetic field, or the magnetic element has characteristics of so-called giant Barkhausen effect.

As shown in FIG. 2, the information reading apparatus 100 comprises an exciting circuit 103, a detection circuit 104, a signal processing unit 106, a bit output unit 107, and a timing control unit 105. The exciting circuit 103 performs control to cause the exciting coil 101 to generate a predetermined alternating magnetic field. The detection circuit 104 detects, by means of the sensing coil 102, a steep magnetic pulse that is generated in the reversal of magnetization by the magnetic element 111 provided in the original document 1 when the magnetic element 111 receives the predetermined alternating magnetic field generated by the exciting coil 101. The signal processing unit 106 performs processing on a detection signal corresponding to the alternating magnetic field detected by the detection circuit 104 or the magnetic pulse generated by the magnetic element 111. The bit output unit 107 outputs a result of determination whether the original document 1 is copiable or not copiable that is made based on the signal processed by the signal processing unit 106. The timing control unit 105 performs timing control for the exciting circuit 103 and the detection circuit 104 to enable the detection circuit 104 to detect the alternating magnetic field or magnetic pulse at a timing corresponding to the cycle of the alternating magnetic field.

A detailed description will now be made of the operation of the information reading apparatus 100 having the configuration as described above for detecting the magnetic element 111 provided in the original document 1, with reference to FIGS. 3 and 4.

Figure 3A:
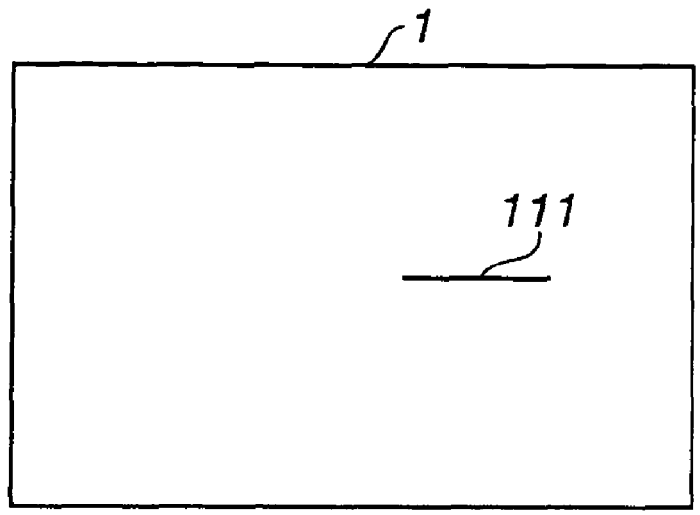
FIGS. 3A and 3B are diagrams illustrating magnetic property of a magnetic element 111 provided in an original document 1.
Figure 3B:
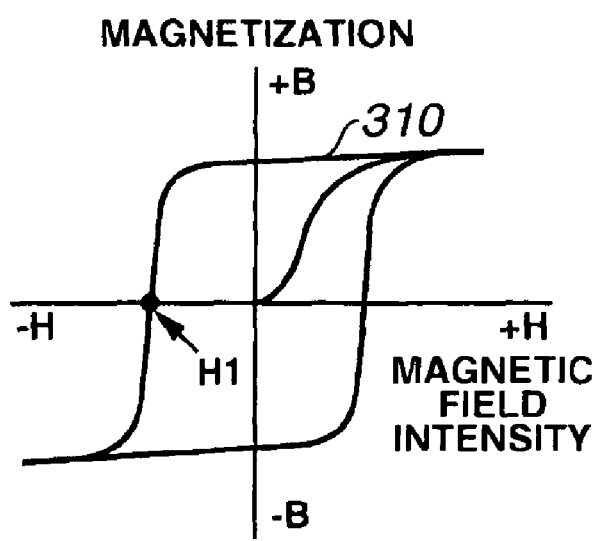

FIGS. 3A and 3B are diagrams illustrating magnetic properties of a magnetic element 111 provided in an original document 1, while FIG. 4 is diagrams illustrating a detection signal detected by the information reading apparatus 100 in response to a magnetic pulse generated by the magnetic element 111 at the reversal of magnetization.

FIG. 3A is a diagram illustrating the original document 1 provided with the magnetic element 11, while FIG. 3B is a diagram illustrating magnetic properties of the magnetic element 111.

Figure 4A:
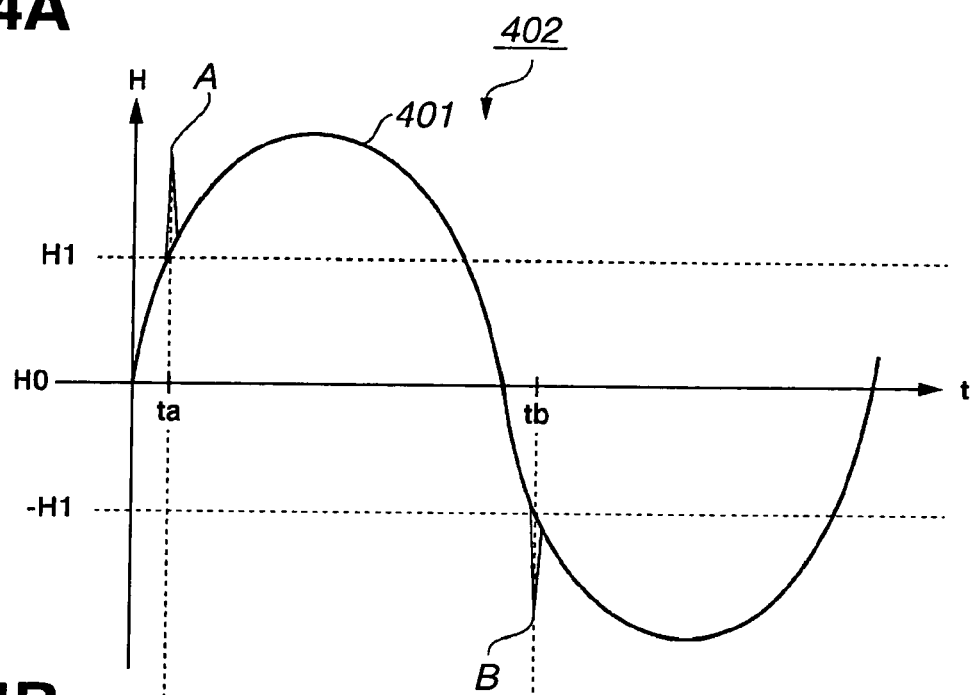
FIGS. 4A and 4B are diagrams illustrating an example of a detection signal of the magnetic element 111 detected by the information reading apparatus 100.
Figure 4B:
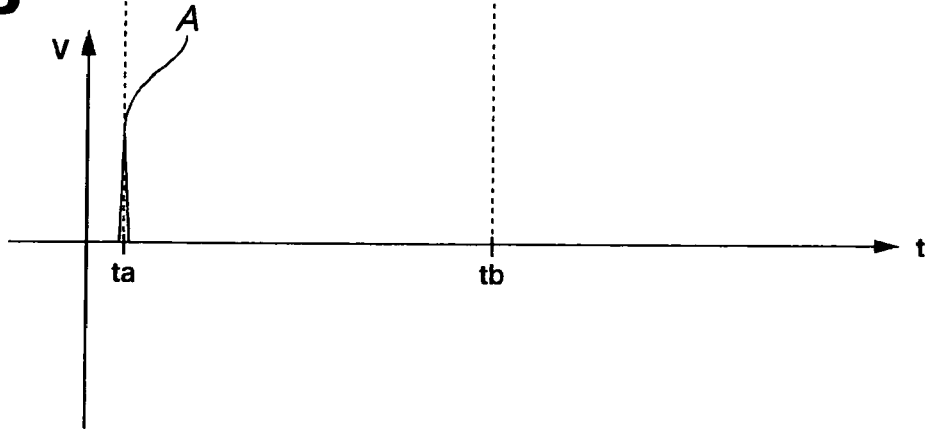

FIG. 4A is a diagram illustrating an alternating magnetic field 401 and a detection signal 402 of a magnetic pulse generated by the magnetic element 111, which are detected by the detected by the detection circuit 104 of the information reading apparatus 100. FIG. 4B is a diagram illustrating a detection pulse signal 403 corresponding to the magnetic pulse detected by the signal processing unit 106 based on the detection signal 402 detected by the detection circuit 104.

As shown in FIGS. 3A and 3B, the magnetic element 111 provided in the original document 1 is a wire of a magnetic material such as Co—Fe amorphous soft magnetic material. The magnetic element 111 has a coercive force that is unique thereto according the diameter and length of the wire.

As seen from FIG. 3B, the magnetic element 111 has magnetic properties which exhibit a rectangular shape defined by magnetic hysteresis curves 310, and has a coercive force H1 as indicated by the magnetic hysteresis curve 310.

The magnetic element 111 having the coercive force H1 will reverse its magnetization when receiving an alternating magnetic field of a field intensity exceeding H1 or −H1, and generates a steep magnetic pulse at the reversal of magnetization.

When the exciting circuit 103 of the information reading apparatus 100 supplies the exciting coil 101 with current of 1 kHz frequency, for example, an alternating magnetic field of 1 kHz frequency is generated in predetermined space corresponding to the shape of the exciting coil 101.

The timing control unit 105 detects the time when the current value becomes zero in the rising direction of the current of 1 kHz frequency generated by the exciting circuit 103, or the time when the direction of the current is reversed from negative to positive. The timing control unit 105 then outputs a reference signal to the detection circuit 104 at the time thus detected, at timing intervals of once a cycle of the alternating magnetic field.

The detection circuit 104 detects, as a detection signal, the signal received by the sensing coil 102 on the basis of the timing of the reference signal output by the timing control unit 105.

More specifically, as seen from the detection signal 402 shown in FIG. 4A, the magnetic element 111 having the coercive force H1 reverses its magnetization when receiving an alternating magnetic field with a magnetic field intensity exceeding substantially H1 around time ta from the reference signal output by the timing control unit 105. At the time of this reversal of magnetization, the magnetic element 111 generates a steep magnetic pulse, which is detected as a pulse signal A. The magnetic element 111 again reverses its magnetization when receiving an alternating magnetic field of a magnetic field intensity exceeding substantially −H1 around time tb. At the time of this reversal of magnetization, the magnetic element 111 generates a steep magnetic pulse which is detected as a pulse signal B.

The detection signal 402 detected by the detection circuit 104 of the information reading apparatus 100 is output to the signal processing unit 106. The signal processing unit 106 removes, from the detection signal 402, a signal component of the alternating magnetic field 401 (hereafter, to be referred to as "alternating magnetic field signal 401") to detect a signal containing the pulse signals A and B. The signal processing unit 106 further extracts a positive signal component therefrom, amplifies the extracted positive signal component, and removes a noise component therefrom. As a result, the detection pulse signal A as shown in FIG. 4B is detected.

The detection pulse signal A detected by the signal processing unit 106 is output to the bit output unit 107. The bit output unit 107 converts the detection pulse signal A into an identification information "1" indicating that the original document is not copiable, and outputs the same.

It should be understood that the association between the detection pulse signal A and the identification information by the bit output unit 107 is only an example, and the present invention is not limited to this.

The copier 10 provided with the information reading apparatus 100 applies a predetermined alternating magnetic field to an original document placed on the platen glass 14 of the copier 10, and identifies whether the original document is copiable or not copiable based on whether or not a magnetic pulse generated by a magnetic element is detected. The copier 10 is thus able to perform a control either for enabling the copying operation or for prohibiting the copying operation.

However, there may be cases in which an original document that is not copiable is failed to be detected as such and ends up being fraudulently copied if such a fraudulent operation is conducted that a magnetic element provided in the original document is purposely and removed.

In order to avoid such fraudulent operations, the medium provided with magnetic elements according to the invention is further provided with plural pseudo elements having the same size and shape as the magnetic element and not detectable by the information reading apparatus 100. These pseudo elements will camouflage the presence of the magnetic element, which makes it difficult to visually identify the presence of the magnetic element indicating the identification information.

Figure 5A:
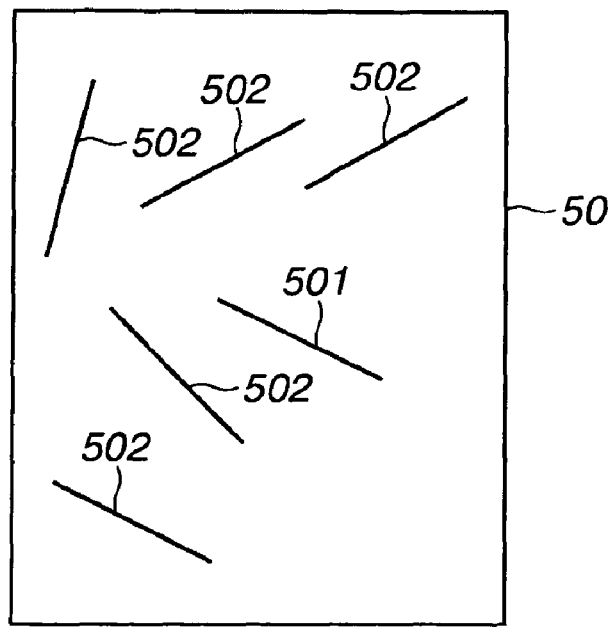
FIGS. 5A and 5B are diagrams illustrating an example of a medium provided with magnetic elements according to the present invention.
Figure 5B:
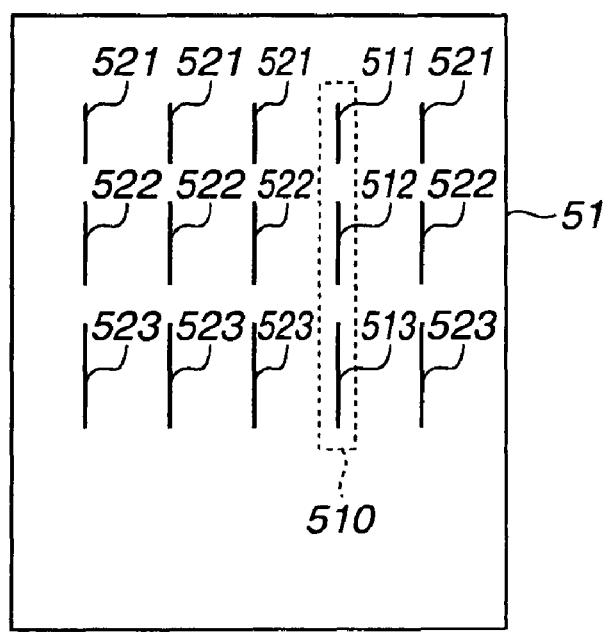

FIGS. 5A and 5B are diagrams illustrating an example of the medium provided with a magnetic element according to the present invention.

FIG. 5A is a diagram illustrating an example of the medium which is assigned with identification information to identify whether the medium is copiable or not copiable based on whether the medium is provided with a magnetic element. FIG. 5B is a diagram illustrating an example of the medium having plural types of magnetic elements for identifying the specificity of the medium.

As shown in FIG. 5A, a paper sheet 50 as the medium is provided with a magnetic element 501 as identification information indicating that the medium is not copiable, as well as plural pseudo elements 502 having the same size as the magnetic element but not detectable by the information reading apparatus 100.

The pseudo elements 502 provided in the paper sheet 50 in addition to the magnetic element 501 camouflage the presence of the magnetic element 501 to make difficult to visually identify the magnetic element 501 provided in the paper sheet 50.

As shown in FIG. 5B, a paper sheet 51 as the medium is assigned with identification information 510 (enclosed with the broken lien) for identifying the specificity of the medium and indicated by three magnetic elements 511, 512, and 513. In addition to the three magnetic elements 511, 512, and 513 indicating the identification information, the paper sheet 51 is further provided with plural pseudo elements 521, 522, and 523 having a same size and shape as the magnetic elements but not detectable by the information reading apparatus 100 for camouflaging the presence of the magnetic elements 511, 512, and 513. These pseudo elements 521, 522, and 523 are arranged in a similar pattern to that of the three magnetic elements 511, 512, and 513 indicating the identification information.

The magnetic elements 511, 512, and 513 have a same diameter, while the length of the magnetic element 511 is shorter than that of the magnetic element 512, and the length of the magnetic element 512 is shorter than that of the magnetic element 513. The magnetic element 511 and the pseudo elements 521, the magnetic element 512 and the pseudo elements 522, and the magnetic element 513 and the pseudo elements 523 respectively have an identical diameter and length to each other.

The method of detecting the identification information indicated by the several types of several magnetic elements will be described later in detail.

Figure 6:
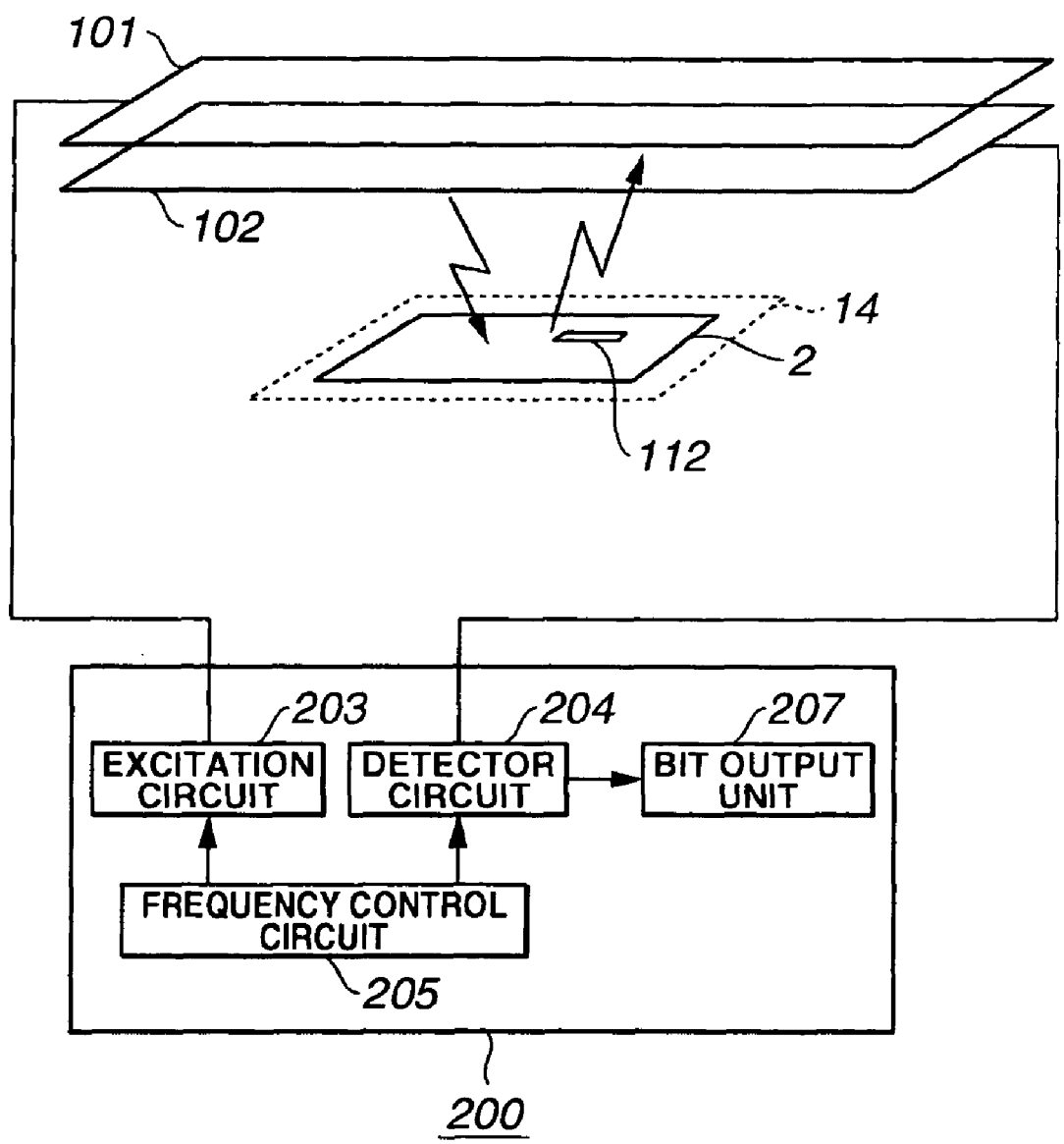
FIG. 6 is a block diagram illustrating configuration of another information reading apparatus 200 than the information reading apparatus 100.

FIG. 6 is a block diagram illustrating configuration of a principal part of an information reading apparatus 200 that is designed to read identification information assigned to a medium, in different configuration from that of the information reading apparatus 100 shown in FIG. 2.

The information reading apparatus 200 shown in FIG. 6 is an information reading apparatus that is applicable when the magnetic element provided in the original document has characteristics to vibrate magnetostrictively when receiving a predetermined magnetic field.

As shown in FIG. 6, the information reading apparatus 200 comprises an exciting circuit 203, a detection circuit 204, a bit output unit 207, and a frequency control circuit 205. The exciting circuit 203 performs control to cause the exciting coil 101 to transmit a predetermined alternating magnetic field that sequentially varies its frequency from a low to a high frequency. When the magnetic element 112 (hereafter to be referred to as the "magnetostrictive vibrator 112" for the convenience of description) provided in the original document 2 placed on the platen glass 14 of the copier 10 receives the predetermined alternating magnetic field transmitted by the exciting coil 101, the magnetic element 112 is magnetized and magnetostrictively vibrates. The detection circuit 204 detects, by means of the sensing coil 102, electromagnetic waves generated during the magnetostrictive vibration of the magnetostrictive vibrator 112, as a voltage signal. Based on the detection signal detected by the detection circuit 204, the bit output unit 207 outputs the detection result in bits indicating whether the original document 2 has a magnetostrictive vibrator 112 or not. The frequency control circuit 205 controls the frequency of the exciting circuit 203 and the detection circuit 204.

The frequency control circuit 205 performs, for example, a control operation to restrict the bandwidth of the set frequency for a band-pass filter circuit (not shown) of the detection circuit 204 in accordance with the frequency of the alternating magnetic field generated by the exciting circuit 203.

The detection of the magnetostrictive vibrator 112 provided in the original document 2 is carried out by intermittently transmitting and applying to the magnetostrictive vibrator 112 an alternating magnetic field which sequentially varies its frequency from a low to high frequency, and detecting electromagnetic waves generated by magnetostrictive vibration of the magnetostrictive vibrator 112 while no alternating magnetic field is transmitted from the exciting coil 101.

The alternating magnetic field that is intermittently transmitted by the exciting coil 101 is designed to vary its frequency sequentially from a predetermined low frequency to a predetermined high frequency. Upon attaining the predetermined high frequency, the alternating magnetic field again varies its frequency from the predetermined low frequency to the high frequency, while being transmitted intermittently.

A detailed description will now be made of the operation of the information reading apparatus 200 configured as described above, for detecting the magnetostrictive vibrator 112 provided in the original document 2, with reference to FIGS. 7A and 7B.

Figure 7A:
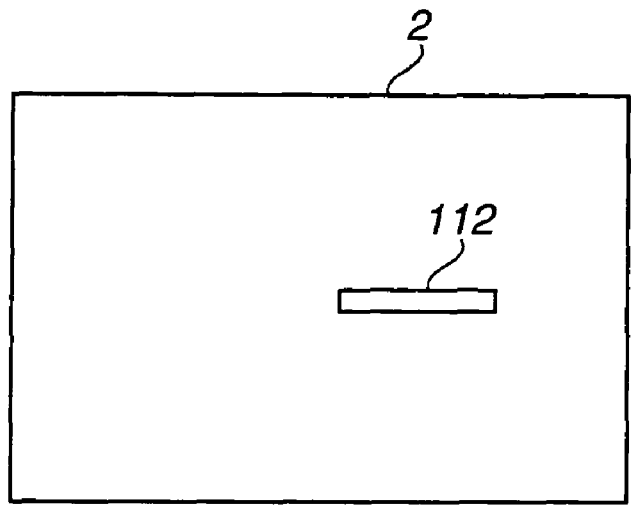
FIGS. 7A and 7B are diagrams illustrating an example of a detection signal of a magnetostrictive vibrator 112 detected by the information reading apparatus 200.
Figure 7B:
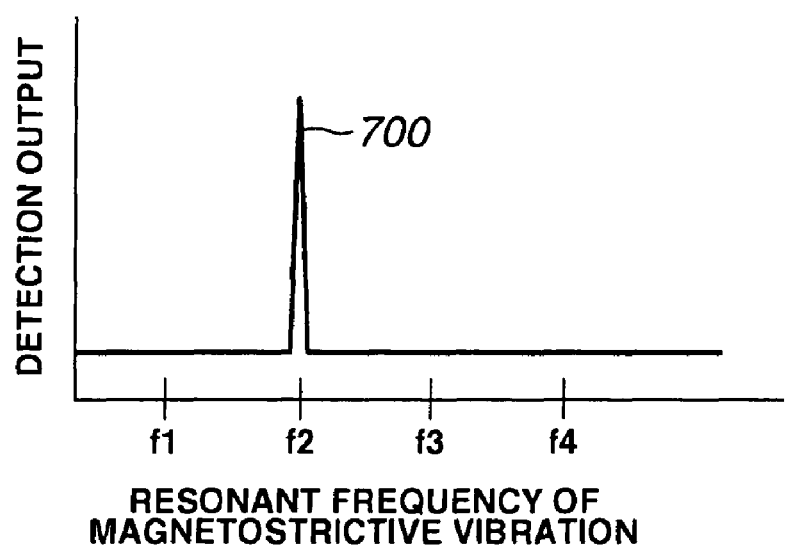

FIG. 7A is a diagram illustrating an example of the original document 2 having the magnetostrictive vibrator 112 to be detected by the information reading apparatus 200, while FIG. 7B is a diagram illustrating a detection signal that is generated when the information reading apparatus 200 detects electromagnetic waves generated by magnetostrictive vibration of the magnetostrictive vibrator 112.

As shown in FIG. 7A, the original document 2 has the magnetostrictive vibrator 112 that is attached thereto as identification information indicating that the original document 2 is not copiable.

The magnetostrictive vibrator 112 is made of a thin ferrite or amorphous foil, and has so-called magnetostrictive property to change its dimensions when a predetermined magnetic field is externally applied thereto.

When a predetermined alternating magnetic field, which varies its frequency sequentially from a low to high frequency or from a high to low frequency, is applied to the magnetostrictive vibrator 112, the magnetostrictive vibrator 112 will magnetostrictively vibrate most intensely when receiving a specific frequency of the alternating magnetic field.

The frequency of the alternating magnetic field that causes the magnetostrictive vibrator 112 to magnetostrictively vibrate most intensely is an intrinsic frequency (hereafter, to be referred to as the resonant frequency") that is specified in accordance with the size and shape of the magnetostrictive vibrator 112.

Here, the description will be made in terms of a case when the resonant frequency of the magnetostrictive vibrator 112 is f2.

When the magnetostrictive vibrator 112 magnetostrictively vibrates, the dimensions of the magnetostrictive vibrator 112 are changed, and thus electromagnetic waves are generated by the magnetostrictive vibrator 112.

Thus, the presence of the magnetostrictive vibrator 112 on the original document 2 can be detected by applying, to the magnetostrictive vibrator 112, an alternating magnetic field corresponding to the resonant frequency intrinsic to the magnetostrictive vibrator 112 to cause the same to magnetostrictively vibrate, and detecting the electromagnetic waves generated by the magnetostrictive vibrator 112.

When the magnetostrictive vibrator 112 provided in the original document 2 is to be detected by the information reading apparatus 200, a voltage is provided to a voltage controlled vibrator (VCO) circuit (not shown) of the exciting circuit 203 so that a waveform signal corresponding to the voltage controlled by the voltage controlled vibrator circuit is generated. The generated waveform signal is then power amplified, so that an alternating magnetic field which varies its frequency from a low to high frequency is intermittently transmitted through the exciting coil 101.

More specifically, after the alternating magnetic field of a low frequency has been transmitted for a certain period of time, the transmission is stopped for a certain period of time. Subsequently, the alternating magnetic field of a high frequency is transmitted for a certain period of time, and then the transmission is stopped for a certain period of time. Such transmission and stoppage of transmission of the alternating magnetic field are repeated sequentially until the frequency of the alternating magnetic field reaches from a predetermined low frequency to a predetermined high frequency. Upon the frequency of the alternating magnetic field reaching the predetermined high frequency, the transmission and stoppage of transmission of the alternating magnetic field are again repeated such that the frequency changes linearly from the low frequency to the high frequency.

As a result of this operation, the magnetostrictive vibrator 112 provided in the original document 2 magnetostrictively vibrates most intensely when receiving the alternating magnetic field of the frequency f2 transmitted by the exciting coil 101. The electromagnetic waves generated by the magnetostrictive vibrator 112 during this magnetostrictive vibration are detected through the sensing coil 102 as a voltage signal, which is then filtered by a band-pass filter circuit (not shown) of the detection circuit 204, amplified by an amplifier circuit (not shown), and detected as a pulse signal 700 corresponding to the resonant frequency f2 of the magnetostrictive vibrator 112, as shown in FIG. 7B.

The pulse signal 700 detected by the detection circuit 204 is output to the bit output unit 207. The bit output unit 207 converts the pulse signal 700 into identification information with a bit value of "1" indicating that the original document 2 is not copiable and outputs the same.

If no pulse signal corresponding to the electromagnetic wave generated by the magnetostrictive vibrator 112 is detected by the detection circuit 204, the bit output unit 207 converts the received signal into identification information having a bit value of "0" and outputs the same.

As described above, a predetermined alternating magnetic field can be applied to the original document 2 placed on the platen glass 14 of the copier 10 provided with the information reading apparatus 200 to detect whether electromagnetic waves generated by the magnetostrictive vibration of the magnetostrictive vibrator 112 are detected or not depending on whether or not the original document has the magnetostrictive vibrator 112. Thus it is possible to identify, based on the detection result, whether the original document placed on the platen glass 14 of the copier 10 is copiable or not copiable.

Figure 8A:
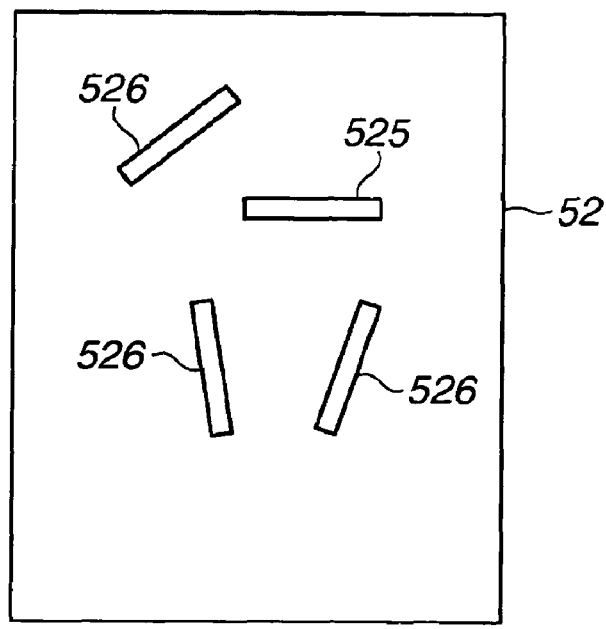
FIGS. 8A and 8B are diagrams illustrating an example of a medium having magnetostrictive vibrators according to the present invention applied hereto.
Figure 8B:
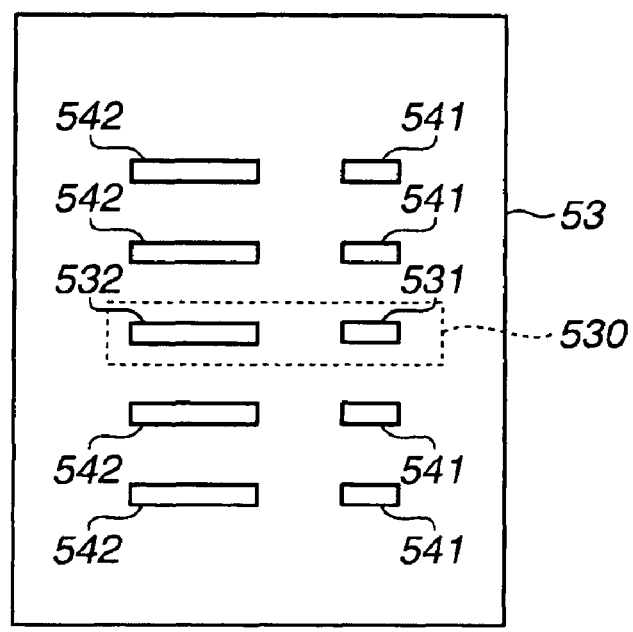

FIGS. 8A and 8B are diagrams illustrating an example of a medium provided with a magnetostrictive vibrator according to the present invention.

FIG. 8A is a diagram illustrating an example of a medium assigned with identification information for identifying whether the medium is copiable or not copiable according to whether or not the medium has a magnetostrictive vibrator, while FIG. 8B is a diagram illustrating another example of a medium having plural magnetostrictive vibrators for identifying the specificity of the medium.

As shown in FIG. 8A, a paper sheet 52 as the medium is provided with a magnetostrictive vibrator 525 as identification information indicating that the paper sheet 52 is not copiable, and plural pseudo elements 526 having a same size and shape as the magnetostrictive vibrator 525 but not detectable by the information reading apparatus 200.

The pseudo elements 526 provided in the paper sheet 52 in addition to the magnetostrictive vibrator 525 camouflage the presence of the magnetostrictive vibrator 525, and makes it difficult to visually identify the magnetostrictive vibrator 525 provided in the paper sheet 52.

As shown in FIG. 8B, a paper sheet 53 as the medium has two magnetostrictive vibrators 531 and 532 indicating identification information 530 (enclosed with the broken line) for identifying the specificity of the medium. In addition to the two magnetostrictive vibrators 531 and 532 indicating the identification information, the paper sheet 53 has plural pseudo elements 541 and 542 having the same sizes and shapes as the magnetostrictive vibrators 531 and 532, respectively, but not detectable by the information reading apparatus 200, in order to camouflage the presence of the magnetostrictive vibrators. These pseudo elements 541 and 542 are arranged in a similar pattern to the two magnetostrictive vibrators 531 and 532 indicating the identification information.

The magnetostrictive vibrator 532 is larger than the magnetostrictive vibrato 531. The magnetostrictive vibrator 531 and the pseudo elements 541 have the same size and shape, and the magnetostrictive vibrato 532 and the pseudo elements 542 have the same size and shape.

A method of detecting the identification information indicated by several types of several magnetostrictive vibrators will be described later in detail.

According to the configuration described above, the presence of the magnetostrictive vibrators provided in the medium for indicating the identification information of the medium can be camouflaged by providing the pseudo elements having the same sizes and shapes as the magnetostrictive vibrators in addition to the those magnetostrictive vibrator. Thus, it is made difficult by this camouflage to visually identify the presence of the magnetostrictive vibrators provided in the medium.

The description so far has been made on the medium which contains magnetic elements or magnetostrictive vibrators, and on the information reading method and apparatus which is designed to detect information of the medium based on a detection result of a magnetic pulse generated by the magnetic element at the reversal of magnetization or an electromagnetic wave generated by magnetostrictive vibration of the magnetostrictive vibrator when a predetermined alternating magnetic field is applied to the magnetic element or magnetostrictive vibrator provided in the medium.

The following description will be made in terms of a copier which is provided with the information reading apparatus 100 or 200 as described above, whereas being designed such that identification information is formed, if required, by providing a magnetic element in a paper sheet on which image information read from an original document is to be printed, the image information read from the original document is printed on the paper sheet having the identification information formed thereon, and the image information read from the original document and the identification information of the paper sheet having the image information printed thereon are managed in association with each other.

Figure 9:
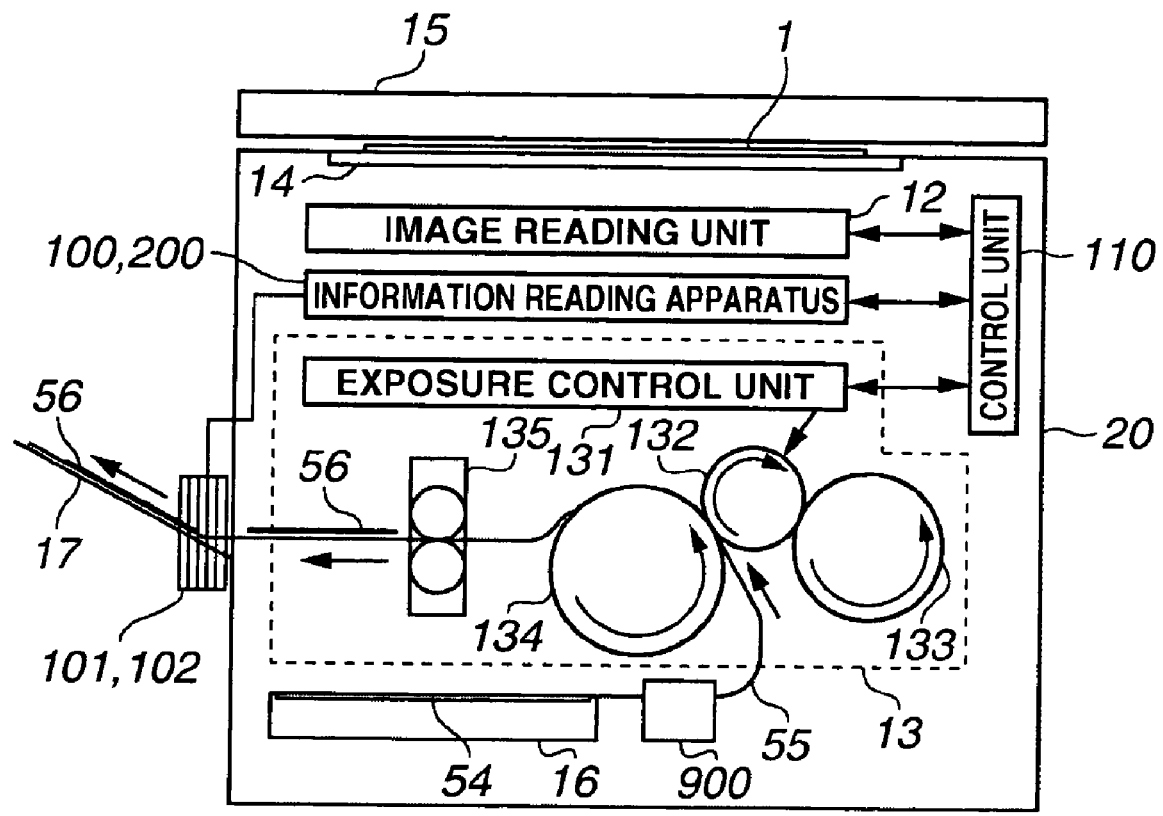
FIG. 9 is a block diagram illustrating configuration of a copier 20 to which the information reading apparatus 100, 200 is applied.

FIG. 9 is a block diagram schematically illustrating a principal part of a copier 20 to which the information reading apparatus 100 or 200 is applied.

The copier 20 shown in FIG. 9 has similar configuration to that of the copier 10, except that the copier 20 further comprises, in addition to the constituent elements of the copier 10 shown in FIG. 1, a magnetic element providing device 900 which provides, to a paper sheet 54 fed from a paper tray 16, a magnetic element or magnetostrictive vibrator indicating identification information of the paper sheet 54 and plural pseudo elements having the same size and shape as the magnetic element or magnetostrictive vibrator, that the exciting coil 101 and the sensing coil 102 of the information reading apparatus 100 or 200 are arranged in the vicinity of a paper delivery tray 17, and that the copier 20 further comprises a database (not shown) for storing and managing the identification information of the paper sheet 54 identified by the information reading apparatus 100 or 200 based on a detection result of the magnetic element or magnetostrictive vibrator provided in the paper sheet 54, in correspondence with the image information printed on the paper sheet 54.

In FIG. 9, the components and elements of the copier 20 which has similar configuration and operate in a similar manner to the copier 10 are designated by the same reference numerals as the copier 10. In order to avoid repetition of the description of the copier 10, the following description will be made only of the configuration and operation of the principal part of the copier 20.

As shown in FIG. 9, the copier 20 comprises a magnetic element providing device 900 which is arranged in a conveyance path along which the paper sheet 54 is conveyed from the paper tray 16 to the image formation unit 13. When an instruction is given to assign identification information and to start copying after an original document 1 is placed on the platen glass 14 of the copier 20 and the platen cover 15 is closed, a magnetic element or magnetostrictive vibrator and pseudo elements are provided in the paper sheet 54 fed from the paper tray 16 by the magnetic element providing device 900. A paper sheet 55 that is formed by providing the magnetic element or magnetostrictive vibrator and the pseudo elements in the paper sheet 54 (hereafter, to be referred to as the "identification information-assigned paper sheet 55") is conveyed to the image formation unit 13.

The image formation unit 13 prints out the image information read from the original document 1 and output by the image reading unit 12 on the identification information-assigned paper sheet 55 delivered to the image formation unit 13, and discharges the printed paper sheet to the paper delivery tray 17.

The printed paper sheet 56 that is formed by printing and thermally fixing the image information read from the original document 1 the identification information-assigned paper sheet 55 is passed, on the way to the paper delivery tray 17, through the spaces respectively defined by the exciting coil 101 and the sensing coil 102 of the information reading apparatus 100 or 200 arranged in the vicinity of the paper delivery tray 17. While passing through these spaces, the magnetic element or magnetostrictive vibrator provided in the printed paper sheet 56 in correspondence with the identification information is magnetized by receiving a predetermined alternating magnetic field generated by the exciting coil 101. A steep magnetic pulse generated at the reversal of magnetization by the magnetic element or electromagnetic waves generated by magnetostrictive vibration of the magnetostrictive vibrator are detected by the sensing coil 102. Based on this detection result, the identification information assigned to the printed paper sheet 56 is read by the information reading apparatus 100 or 200.

The identification information read by the information reading apparatus 100 or 200 is output to the control unit 110. The control unit 110 performs document management by storing and managing, in the database (not shown), the identification information of the printed paper sheet 56 read by the information reading apparatus 100 or 200 in association with the image information of the original document 1 read by the image reading unit 12.

The use of the copier 20 operating in this manner enables the document management to associate the image information of the original document 1 with the identification information of the printed paper sheet 56 on which the image information is printed.

Figure 10A:
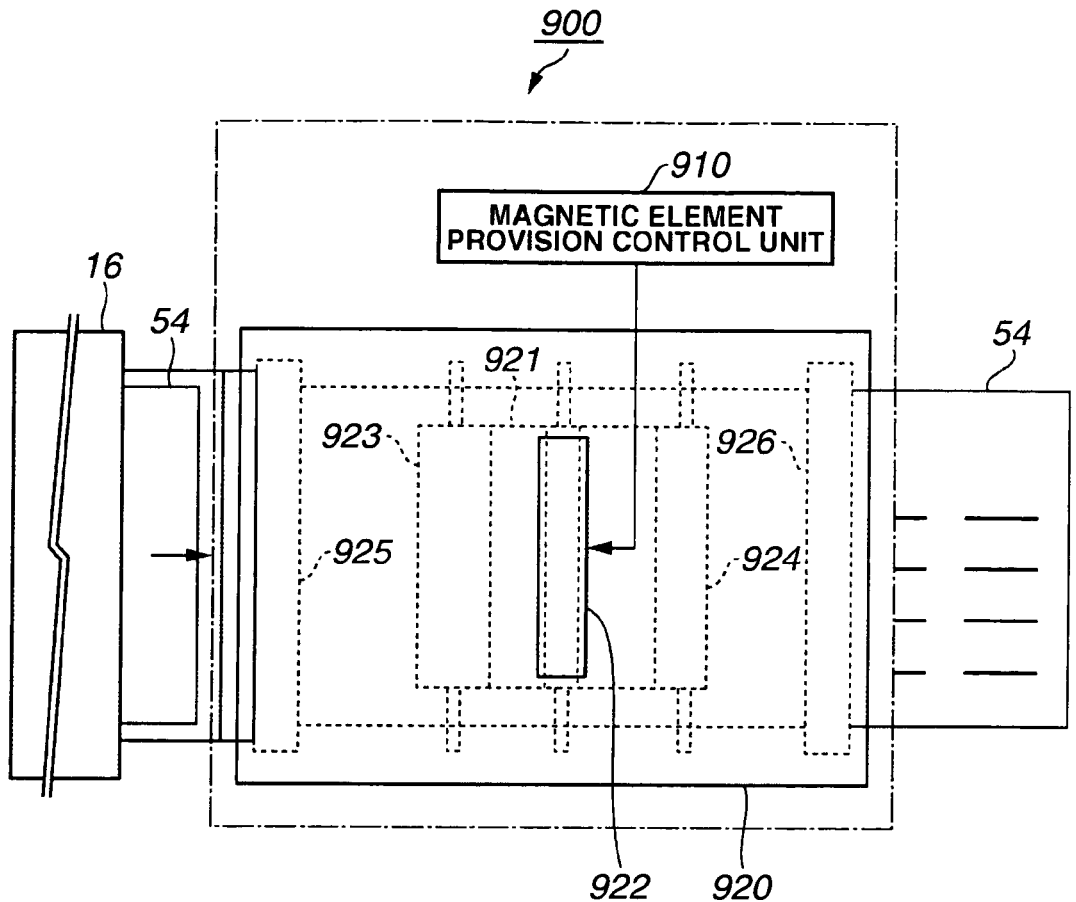
FIGS. 10A and 10B are diagrams schematically illustrating configuration of a magnetic element providing device 900.
Figure 10B:
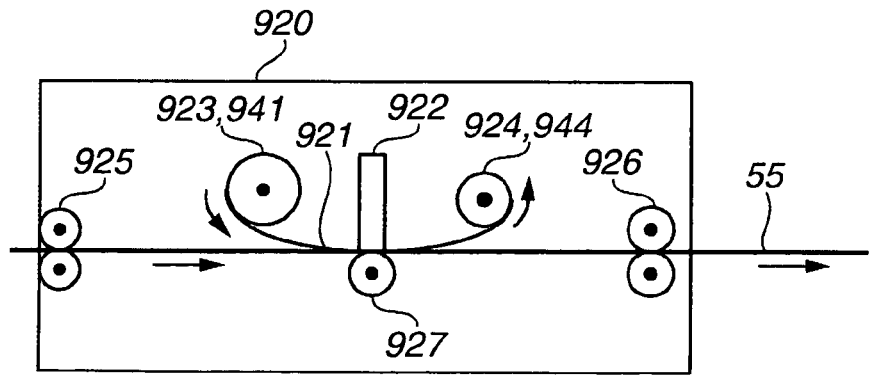

FIGS. 10A and 10B are diagrams schematically illustrating configuration of the magnetic element providing device 900 (enclosed with the dash-dot line).

FIG. 10A is a schematic plan view of the magnetic element providing device 900, while FIG. 10B is a schematic side view of the magnetic element providing device 900.

As shown in FIG. 10A, the magnetic element providing device 900 (enclosed with the dash-dot line) comprises a magnetic element provision control unit 910 and a magnetic element providing unit 920. The magnetic element provision control unit 910 controls the entire of the magnetic element providing device 900 based on a command signal from the control unit 110 of the copier 20. The magnetic element provision control unit 910 also performs control either for assigning identification information to the paper sheet 54 that is conveyed from the paper feed tray 16 to the image formation unit 13, or for passing the paper sheet 54 through the magnetic element providing device 900 and conveying the same to the image formation unit 13 without assigning the identification information thereto.

As shown in FIG. 10B, the magnetic element providing unit 920 comprises a pair of paper feed rollers 925 arranged in the conveyance path for the paper sheet 54 on the side of the magnetic element providing unit 920 close to the paper feed tray 16, and a pair of paper feed rollers 926 arranged in the conveyance path for the paper sheet 54 on the side of the magnetic element providing unit 920 close to the image formation unit 13. The paper sheet 54 fed from the paper feed tray 16 is introduced into the magnetic element providing unit 920 by the paper feed rollers 925. The paper sheet 54 thus introduced is then conveyed out of the magnetic element providing unit 920 by the paper feed rollers 926.

A heat element 922 is arranged between the pairs of the rollers 925 and 926, and a guide roller 927 is arranged in the position opposing to the heat element 922. The paper sheet 54 fed from the paper feed tray 16 is passed between the pair of paper feed rollers 925, between the heat element 922 and the guide roller 927, and between the pair of paper feed rollers 926 to be conveyed from the magnetic element providing unit 920 to the image formation unit 13.

The magnetic element providing unit 920 further comprises a sheet feed roller 923 on which a thermal transfer sheet 921 including magnetic elements and pseudo elements is wound sufficiently or a sheet feed roller 944 on which a thermal transfer sheet 941 including magnetostrictive vibrators and pseudo elements is wound sufficiently.

The magnetic element providing unit 920 further comprises a sheet take-up roller 924 attached to an end of the thermal transfer sheet 921 or a sheet take-up roller 944 attached to an end of the thermal transfer sheet 941.

The thermal transfer sheet 921 or 941 is fed out from the sheet feed roller 923 or 941 by the drive control of the magnetic element provision control unit 910, and taken up by the sheet take-up roller 924 or 944.

While being fed in this manner, the thermal transfer sheet 921 or 941 is passed, together with the paper sheet 54, between the heat element 922 and the guide roller 927 under the control of the magnetic element provision control unit 910.

The sheet feed roller 923 and the sheet take-up roller 924, or the sheet feed roller 941 and the sheet take-up roller 944 are rotatably supported on the respective shafts.

The heat element 922 is operated in conjunction with the sheet feed roller 923 and the sheet take-up roller 924, whereby the magnetic elements and the pseudo elements included in the thermal transfer sheet 921 are thermally transferred onto the paper sheet 54, and thus the magnetic elements indicating the identification information of the paper sheet 54 and the pseudo elements camouflaging the presence of the magnetic elements are formed on the paper sheet 54.

Alternatively, the heat element 922 is operated in conjunction with the sheet feed roller 941 and the sheet take-up roller 944, whereby the magnetostrictive vibrator and the pseudo elements included in the thermal transfer sheet 941 are thermally transferred onto the paper sheet 54, and thus the magnetostrictive vibrators indicating the identification information of the paper sheet 54 and the pseudo elements camouflaging the presence of the magnetostrictive vibrators are formed on the paper sheet 54.

Figure 11A:
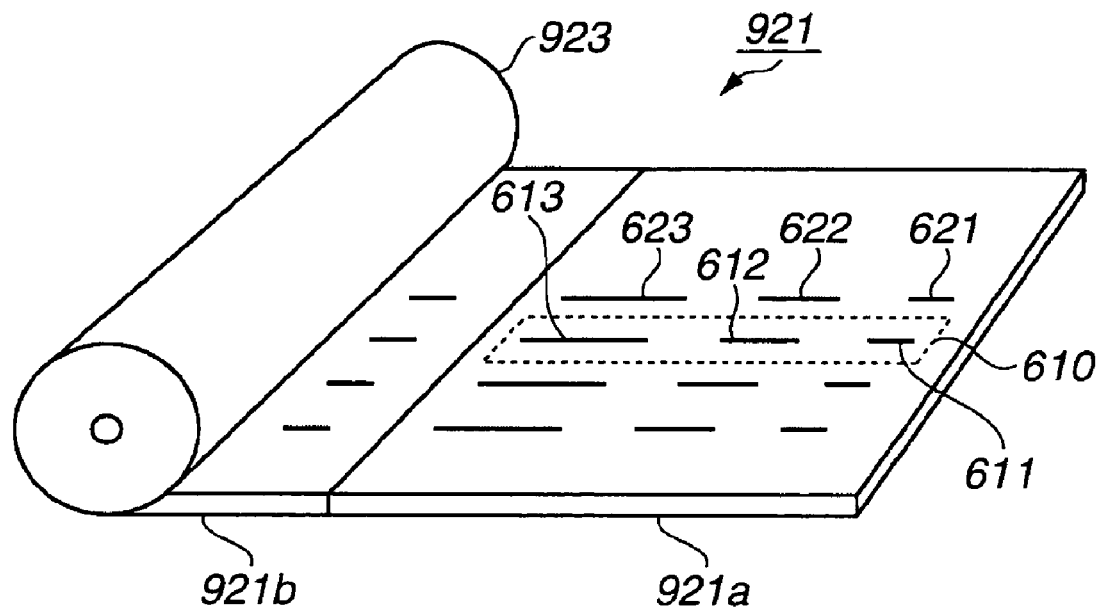
FIGS. 11A and 11B are diagrams illustrating a structure of a thermal transfer sheet 921.
Figure 11B:
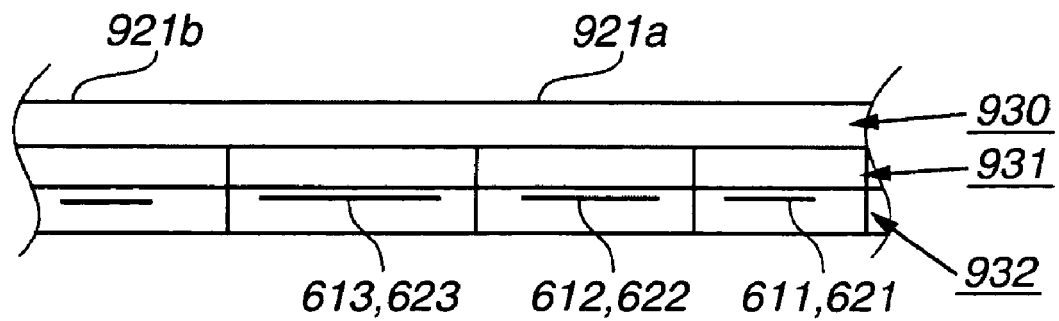

FIGS. 11A and 11B are diagrams illustrating the structure of the thermal transfer sheet 921 wound on the sheet feed roller 923.

FIG. 11A is a diagram illustrating a basic structure of the thermal transfer sheet 921, while FIG. 11B is an enlarged view showing the structure of the thermal transfer sheet 921.

As shown in FIGS. 11A and 11B, the thermal transfer sheet 921 is composed of three layers: a sheet substrate 930, a thermofusible layer 931 formed of a thermofusible material, and an adhesive layer 932. The adhesive layer 932 is composed of magnetic elements 611, 612 and 613, plural pseudo elements 621, 622 and 623, and an adhesive material.

The thermofusible layer 931 and the adhesive layer 932 are divided at predetermined intervals in the direction orthogonal to the paper conveyance direction. Each of the sections 921a and 921b of the divided thermal transfer sheet 921 comprises the magnetic elements 611, 612 and 613 and the plural pseudo elements 621, 622 and 623.

An acetate film may be used as the sheet substrate 930, and an acrylic adhesive material may be used as the adhesive material.

The number, type, and arrangement pattern of the magnetic elements are not limited to those shown in FIG. 11, and may be selected as desired, and the arrangement pattern of the pseudo elements may also be selected as desired according to the pattern of the magnetic elements.

A brief description will now be made of basic processing for thermally transferring the magnetic elements 611, 612 and 613 and the plural pseudo elements 621, 622 and 623 of the thermal transfer sheet 921 onto the paper sheet 54.

Figure 12A:
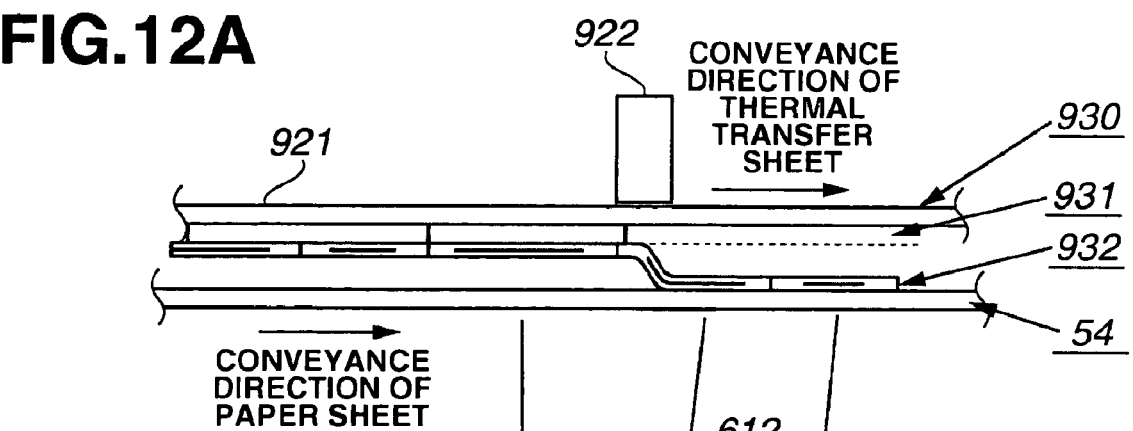
FIGS. 12A and 12B are explanatory diagrams illustrating a basic processing operation to thermally transfer the magnetic elements and the pseudo elements from the thermal transfer sheet 921 onto a paper sheet 54.
Figure 12B:
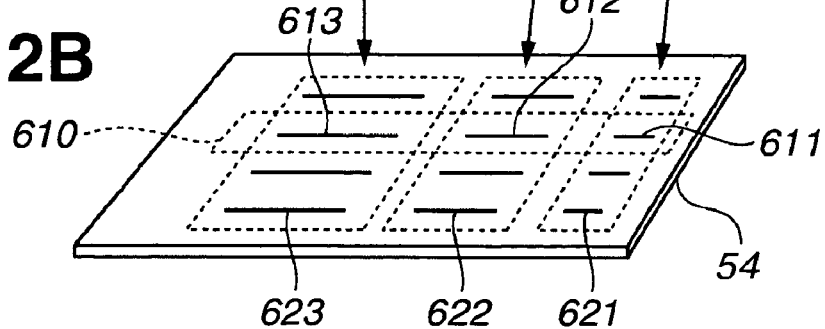

FIGS. 12A and 12B are diagrams illustrating the basic processing for thermally transferring the magnetic elements 611, 612 and 613 and the plural pseudo elements 621, 622 and 623 of the thermal transfer sheet 921 onto the paper sheet 54. The description will be made with reference to FIGS. 12A and 12B.

When the paper sheet 54 fed from the paper feed tray 16 by the paper feed roller 925 is conveyed to the position of the heat element 922 in the magnetic element providing unit 920 of the magnetic element providing device 900, the operation of the sheet feed roller 923 and the sheet take-up roller 924 is controlled, while causing the heat element 922 to generate heat if required, so that the magnetic elements 611, 612 and 613 and the pseudo elements 621, 622 and 623 are thermally transferred and attached onto the paper sheet 54.

The thermofusible layer 931 (the thermofusible layer in the region enclosed with the broken line) that was at the position facing the heat element 922 as shown in FIG. 12A before the heat generation of the heat element 922 is fused by the heat generated by the heat element 922, and the adhesive layer 932 in the position corresponding to the fused thermofusible layer 931 is removed from the thermal transfer sheet and stuck on the paper sheet 54 that is conveyed together with the thermal transfer sheet 921.

The conveyance speed of the thermal transfer sheet 921 is controlled to be equal to the conveyance speed of the paper sheet 54 during the heat generation of the heat element 922.

In this manner, the plural magnetic elements 611, 612 and 613 associated with the identification information assigned to the paper sheet 54 and the plural pseudo elements 621, 622 and 623 for camouflaging the presence of the magnetic elements are provided in the paper sheet 54 as shown in FIG. 12B.

Figure 13A:
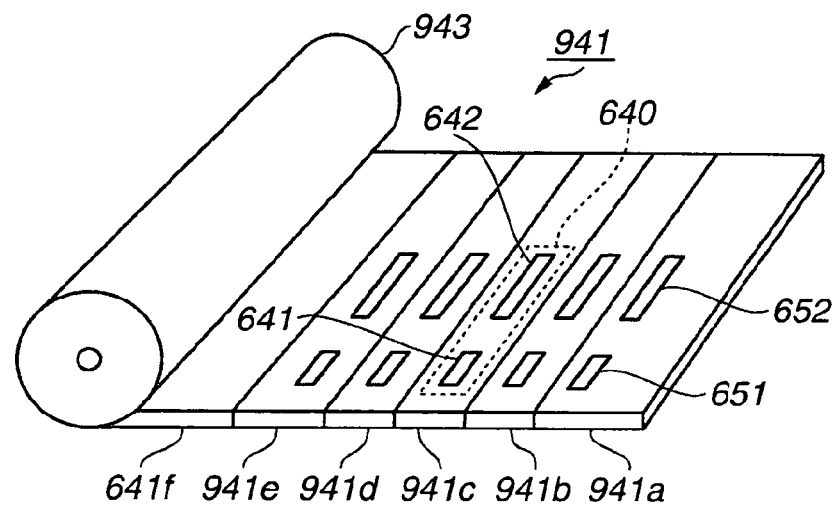
FIGS. 13A through 13C are diagrams illustrating a structure of another thermal transfer sheet 941 than the thermal transfer sheet 921.
Figure 13B:
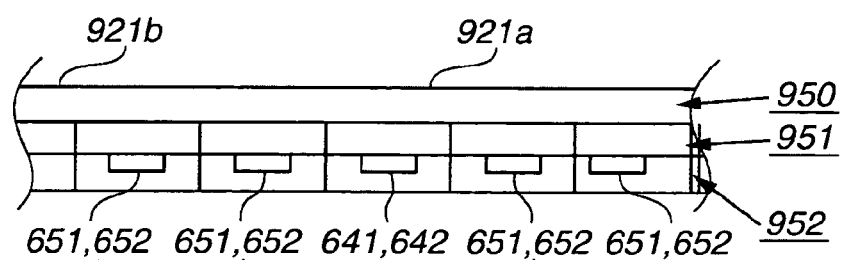

FIGS. 13A and 13B are diagrams illustrating a structure of another thermal transfer sheet 941 than the thermal transfer sheet 921 shown in FIGS. 11A and 11B.

FIG. 13A is a diagram illustrating a basic structure of the thermal transfer sheet 941, and FIG. 13B is an enlarged view of the structure of the thermal transfer sheet 941.

As shown in FIGS. 13A and 13B, the thermal transfer sheet 941 is composed of three layers: a sheet substrate 950, a thermofusible layer 951 formed of a thermofusible material, and an adhesive layer 952 including magnetostrictive vibrators 641 and 642 forming identification information, plural pseudo elements 651 and 652, and an adhesive material.

The thermofusible layer 951 and the adhesive layer 952 are divided at predetermined intervals in the direction orthogonal to the paper conveyance direction.

One section 951c of the divided thermal transfer sheet 941 comprises the magnetostrictive vibrators 641 and 642 indicating the identification information, while sections 941a, 951b, 951d 951e each include the pseudo elements 651 and 652.

An acetate film may be used as the sheet substrate 950, and an acrylic adhesive material may be used as the adhesive material.

The number, type, and arrangement pattern of the magnetostrictive vibrators are not limited to those shown in FIGS. 13A and 13B, and may be selected as desired. The arrangement pattern of the pseudo elements may also be selected as desired according to the pattern of the magnetostrictive vibrators.

When the paper sheet 54 fed from the paper feed tray 16 by the paper feed roller 925 is conveyed to the position of the heat element 922 in the magnetic element providing unit 920 of the magnetic element providing device 900, the operation of the sheet feed roller 943 and the sheet take-up roller 944 is controlled, while causing the heat element 922 to generate heat if required, so that the magnetostrictive vibrators 641 and 642 and the pseudo elements 651 and 652 are thermally transferred and provided in the paper sheet 54.

Figure 13C:
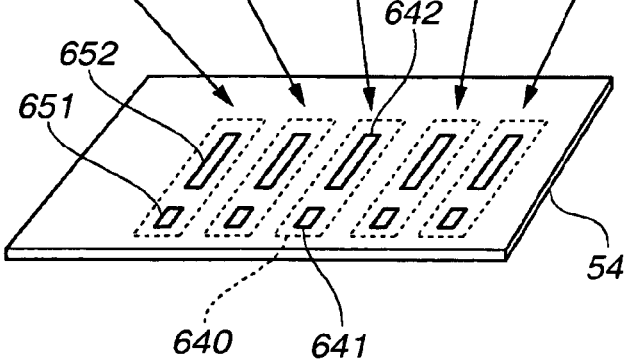

The thermofusible layer 951 that was at the position facing the heat element 922 is fused by the heat generated by the heat element 922, and the adhesive layer 952 in the position corresponding to the fused thermofusible layer 951 is removed from the thermal transfer sheet and stuck on the paper sheet 54 that is conveyed together with the thermal transfer sheet 941. As a result, as shown in FIG. 13C, the plural magnetostrictive vibrators 641 and 642 corresponding to the identification information 640 of the paper sheet 54 and the plural pseudo elements 651 and 652 camouflaging the presence of the magnetostrictive vibrators 641 and 642 are attached to the paper sheet 54.

Figure 14A:
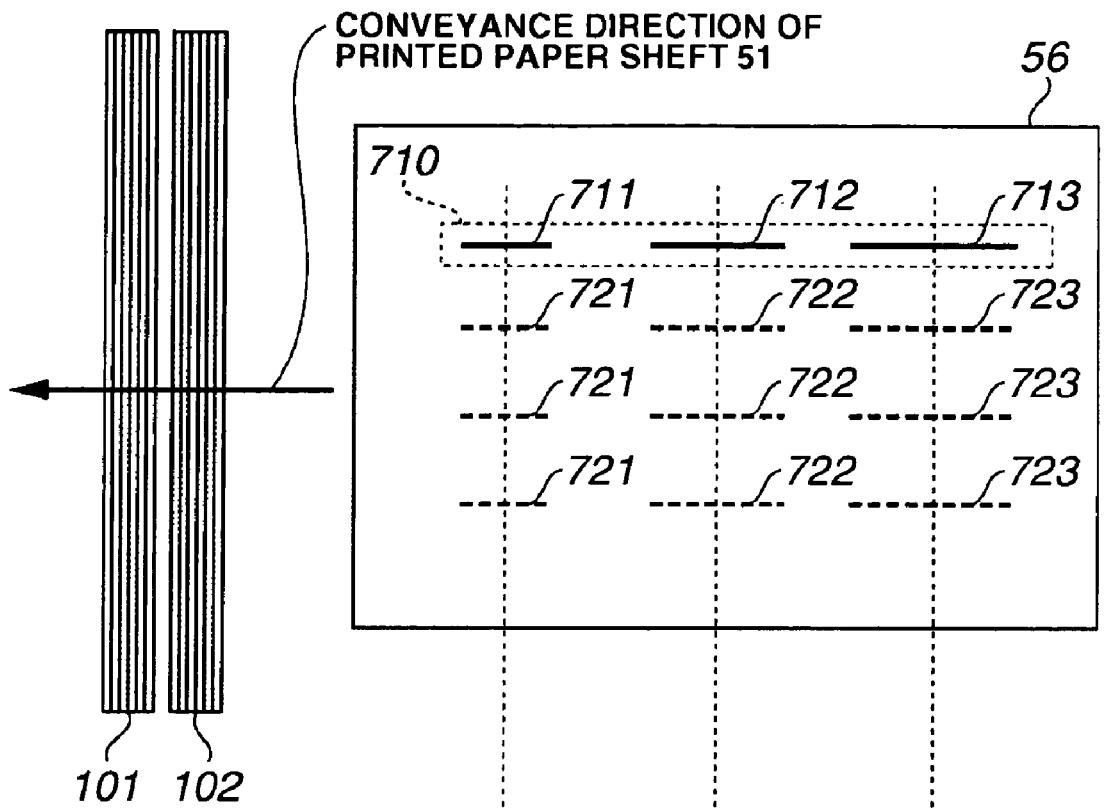
FIGS. 14A and 14B are explanatory diagrams illustrating a method of identifying identification information indicated by plural magnetic elements, by the information reading apparatus 100.
Figure 14B:
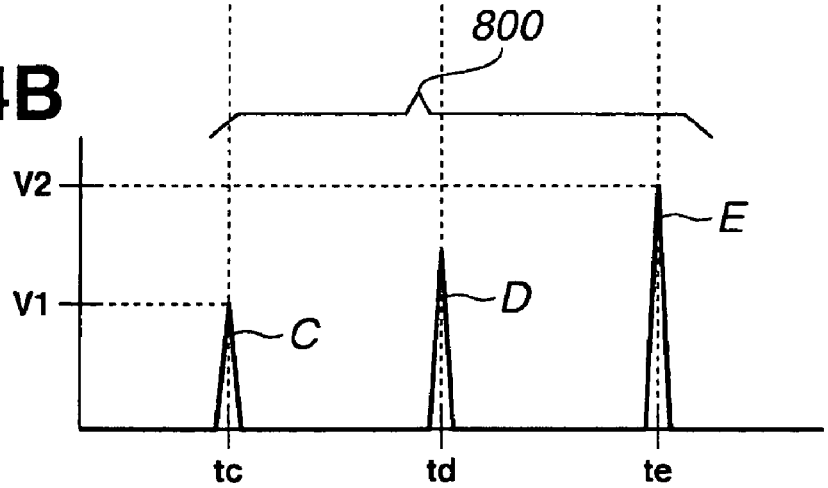

FIGS. 14A and 14B are explanatory diagrams for explaining a method in which the information reading apparatus 100 identifies identification information indicated by plural magnetic elements having different lengths.

FIG. 14A illustrates the arrangement of three magnetic elements 711, 712 and 713 and pseudo elements 721, 722 and 723 provided in the printed paper sheet 56, and FIG. 14B is a diagram illustrating a detection pulse signal pattern 800 detected by the information reading apparatus 100 from the printed paper sheet 56 and the identification information identified based on the detection pulse signal pattern 800.

The pseudo elements 721, 722 and 723 provided in the printed paper sheet 56 are indicated by the broken lines, for the convenience of description.

Although the type and number of the magnetic elements provided in the printed paper sheet 56 are not limited particularly, FIGS. 14A and 14B illustrate an example, for the convenience of description, in which the paper sheet 56 is assigned with identification information that is indicated by a combination of three different magnetic elements. The magnetic elements 711, 712 and 713 have an equal diameter and different lengths, which become longer in the order of the magnetic elements 711, 712 and 713.

As shown in FIG. 14A, the printed paper sheet 56 is provided with three magnetic elements 711, 712 and 713 and indicating the identification information 710 of the printed paper sheet 56. The magnetic elements have different coercive forces depending on their lengths. Specifically, the magnetic element 711 has a coercive force Hc, the magnetic element 712 has a coercive force Hd, and the magnetic element 713 has a coercive force He.

When the printed paper sheet 56 is moved through the exciting coil 101 and the sensing coil 101 at a fixed conveyance speed V, the magnetic elements 711, 712 and 713 provided in the printed paper sheet 56 are magnetized by receiving an alternating magnetic field generated by the exciting coil 101 sequentially in the order of the magnetic elements

711, 712 and 713. Specifically, the magnetic elements 711 that is at the foremost position in the conveyance direction of the printed paper sheet 56 (the direction indicated by the arrow) is magnetized first, the magnetic element 712 next, and the magnetic element 713 in the last place. Each of the magnetic elements generates a magnetic pulse at the reversal of magnetization, and such magnetic pulse is detected by the sensing coil 102 as a detection pulse signal pattern 800 as shown in FIG. 14B.

The detection pulse signal pattern 800 includes a steep magnetic pulse that is generated by the reversal of magnetization of the magnetic element 711 when receiving an alternating magnetic field exceeding the magnetic field intensity Ha and detected as a detection pulse signal C of detection output Vc and detection time tc. The detection pulse signal pattern 800 also includes a steep magnetic pulse that is generated by the reversal of magnetization of the magnetic element 712 when receiving an alternating magnetic field exceeding the magnetic field intensity Hd and detected as a detection pulse signal D of detection output Vd and detection time td. The detection pulse signal pattern 800 further includes a steep magnetic pulse that is generated by the reversal of magnetization of the magnetic element 713 when receiving an alternating magnetic field exceeding the magnetic field intensity He and detected as a detection pulse signal E of detection output Ve and detection time te.

Thus, the detection pulse signal of detection time t and detection output V is detected corresponding to each of the magnetic elements provided in the printed paper sheet 56, and the identification information of the printed paper sheet 56 is identified based on the detection results of these detection pulse signals.

The detection pulse signals may be associated with the identification information, for example, depending on what place in the order of detection among the three detection pulse signals C, D and E contained in the detection pulse signal pattern 800, the detection pulse signal C is detected, having the smallest detection output, in response to the magnetic pulse generated by the magnetic element 711.

More specifically, the identification information is formed of three bits corresponding to the number of detection pulse signals C, D and E contained in the detection pulse signal pattern 800. The identification information when the detection pulse signal C is detected first is defined as "100", the identification information when detected second is associated as "010", and the identification information when detected third is defined as "001". Thereby, the identification information assigned to the printed paper sheet 56 is identified as "100" based on the detection pulse signal pattern 800.

Figure 15A:
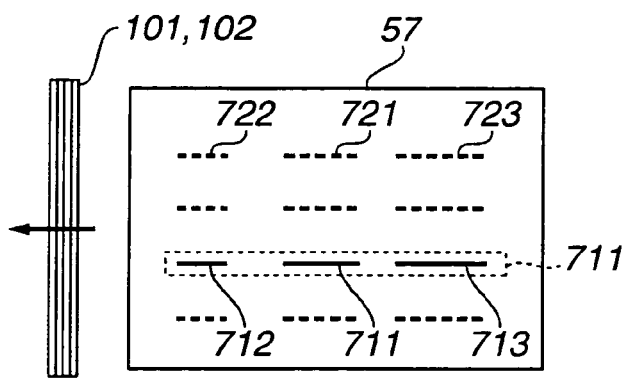
FIGS. 15A through 15D are explanatory diagrams illustrating the correspondence between the identification information and the detection signals of the plural magnetic elements.
Figure 15C:
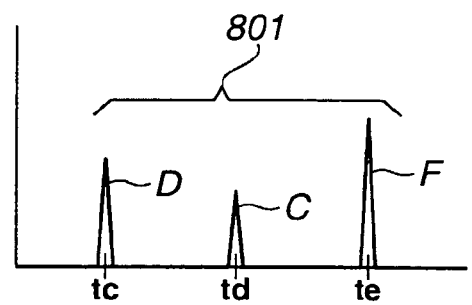

When a printed paper sheet 57 is provided with three magnetic elements 711, 712 and 713 in the sequence of the magnetic elements 712, 711 and 713 from the foremost in the conveyance direction of the conveyance direction as shown in FIG. 15A, a detection pulse signal pattern 801 is detected (FIG. 15C). Referring to FIG. 15C, in the detection pulse signal pattern 801, the detection pulse signal C is detected second. Therefore, the identification information of the printed paper sheet 57 is identified as "010".

Figure 15B:
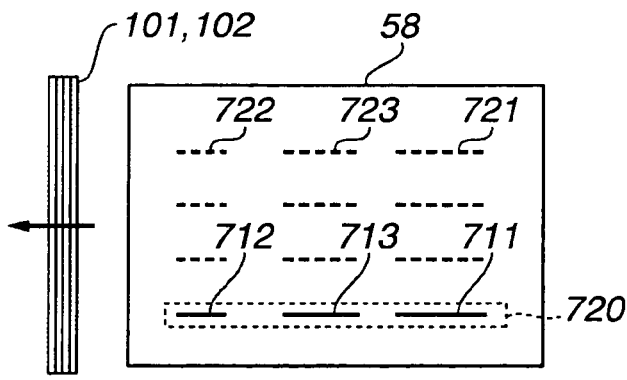
Figure 15D:
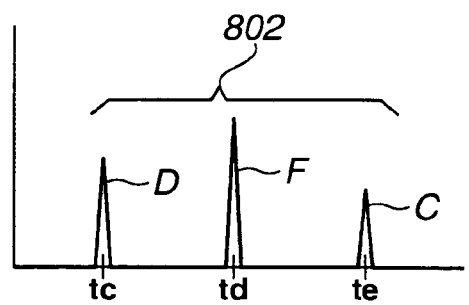

When a printed paper sheet 58 is provided with three magnetic elements 711, 712 and 713 in the sequence of the magnetic elements 712, 713 and 711 from the foremost in the conveyance direction of the conveyance direction of the printed paper sheet 58 as shown in FIG. 15B, a detection pulse signal pattern 802 is detected (FIG. 15D). Referring to FIG. 15D, in the detection pulse signal pattern 802, the detection pulse signal C is detected third. Therefore, the identification information of the printed paper sheet 58 is identified as "001".

The identification information may be associated with a number of the detection pulse signals contained in the detection pulse signal pattern, or may be associated with whether or not a detection pulse signal is detected around a specific time, or may be associated with a pattern of detection output values.

Figure 16A:
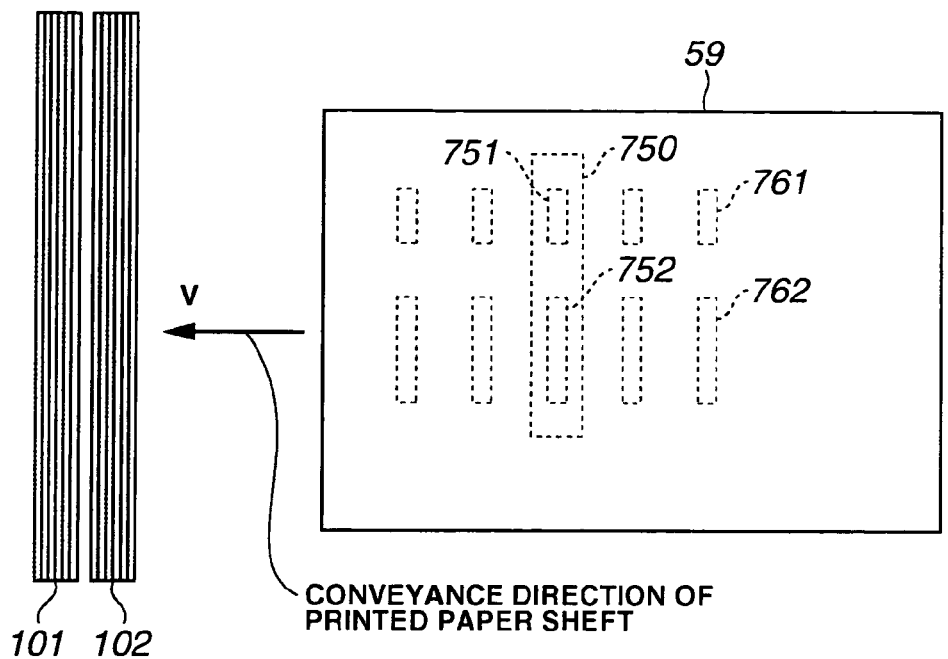
FIGS. 16A and 16B are explanatory diagrams illustrating a method of identifying identification information indicated by plural magnetostrictive vibrators, by the information reading apparatus 200.
Figure 16B:
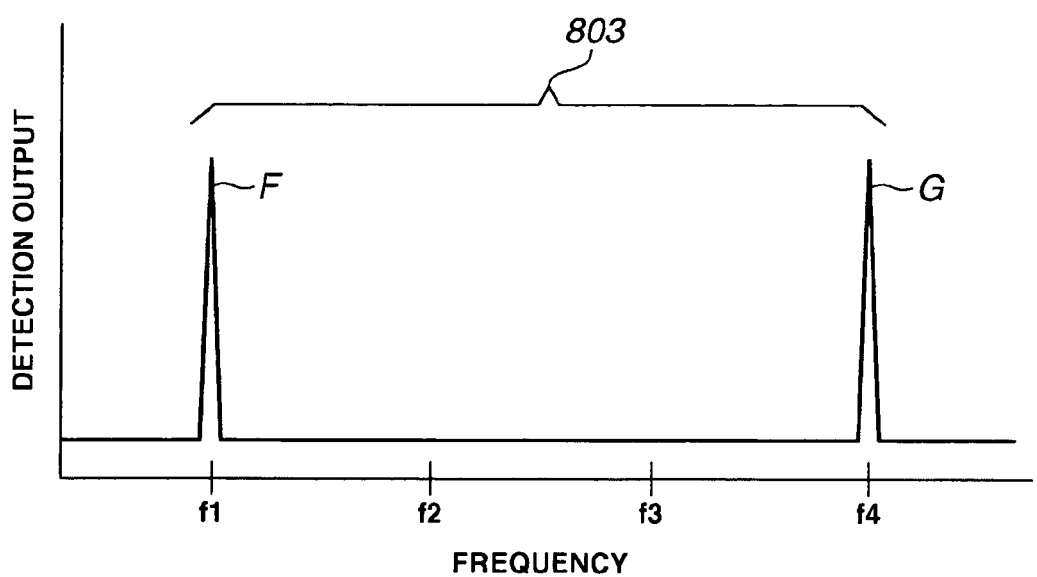

FIGS. 16A and 16B are diagrams illustrating an example of a method in which the information reading apparatus 200 reads identification information assigned to a printed paper sheet 59 and indicated by two different magnetic elements.

FIG. 16A is a diagram illustrating arrangement of two magnetostrictive vibrators 751 and 752 provided in the printed paper sheet 58 in correspondence with the identification information 750. FIG. 16B is a diagram illustrating a detection signal of the printed paper sheet 59 that is by the information reading apparatus 200 when the printed paper sheet 59 is conveyed through the exciting coil 101 and the sensing coil 102 at a fixed conveyance speed V. FIG. 16B also shows a detection pulse signal pattern 803 detected by the information reading apparatus 200 from the printed paper sheet 59 and the identification information identified based on the detection pulse signal pattern 803.

In FIG. 16A, pseudo elements 761 and 762 provided in the printed paper sheet 59 are indicated by the broken lines for the convenience of description.

The magnetostrictive vibrators which are applied in correspondence with the identification information 750 previously assigned to the printed paper sheet 59 may be formed by a combination of several different magnetostrictive vibrators. For the convenience of description, however, FIGS. 16A and 16B illustrate an example in which two different magnetostrictive vibrators 751 and 752 are used. As shown in FIG. 16A, the printed paper sheet 59 is provided with narrow foil-like magnetostrictive vibrators 751 and 752 having different lengths. The magnetostrictive vibrators 751 and 752 have characteristics to magnetostrictively vibrate when receiving an alternating magnetic field of a predetermined frequency, and are associated with identification information that is previously assigned to the printed paper sheet 59. In addition to the magnetostrictive vibrators, the printed paper sheet 59 has plural pseudo elements 761 and 762 having same shapes and sizes to the respective magnetostrictive vibrators 751 and 752, and these pseudo elements 761 and 762 are arranged in the same pattern as the magnetostrictive vibrators.

The following description will be made on the assumption that the magnetostrictive vibrator 751 has a resonant frequency f2, and the magnetostrictive vibrator 752 has a resonant frequency f1.

When the printed paper sheet 59 is moved through the exciting coil 101 and the sensing coil 101 at the fixed conveyance speed V, the magnetostrictive vibrators 751 and 752 provided in the printed paper sheet 59 are subjected to an alternating magnetic field generated by the exciting coil 101 and thereby caused to magnetostrictively vibrate. Electromagnetic waves generated by the magnetostrictive vibration of the magnetostrictive vibrators 751 and 752 are detected by the sensing coil 102 as a detection pulse signal pattern 803 as shown in FIG. 16B.

The detection pulse signal pattern 803 thus detected includes a detection pulse signal F of the frequency f1 that is an electromagnetic wave generated by magnetostrictive vibration of the magnetostrictive vibrator 751 when the exciting coil 101 emits an alternating magnetic field of a frequency around f1. The detection pulse signal pattern 803 also includes a detection pulse signal G of the frequency f2 that is an electromagnetic wave generated by magnetostrictive vibration of the magnetostrictive vibrator 752 when the exciting coil 101 emits an alternating magnetic field of a frequency around f2.

Thus, by applying an alternating magnetic field of a predetermined frequency to the printed paper sheet 59, a detection pulse signal is detected, corresponding to the electromagnetic wave generated by each of the magnetostrictive vibrators provided in the printed paper sheet 59 around a frequency corresponding to the resonant frequency peculiar to the magnetostrictive vibrator. Accordingly, the identification information of the printed paper sheet 59 is identified based on the detection result.

When the identification information of the printed paper sheet 59 is indicated by the magnetostrictive vibrators 751 and 752 provided in the printed paper sheet 59, the detection pulse signals may be associated with the identification information in the following manner. The identification information is formed of a number of bits corresponding to the number of types of the magnetostrictive vibrators, so that the first bit corresponds to information indicating whether or not the magnetostrictive vibrator 751 is detected, and the second bits corresponds to information indicating whether or not the magnetostrictive vibrator 752 is detected. Thus, if both the detection pulse signals F and G are detected, the identification information is identified as "11". Whereas, if the detection pulse signal F only is detected, the identification information is identified as the "10" and, if the detection pulse signal G only is detected, the identification information is identified as "01".

As described above, according to the present invention, identification information is formed on a paper sheet on which image information read from an original document is to be printed, by providing either a magnetic element or magnetostrictive vibrator as required. After printing the image information read from the original document on the paper sheet assigned with the identification information, the original document read from the image information and the identification information of the paper sheet on which the image information is printed are managed in association with each other. This ensures enhanced security for the document management.

Figure 17:
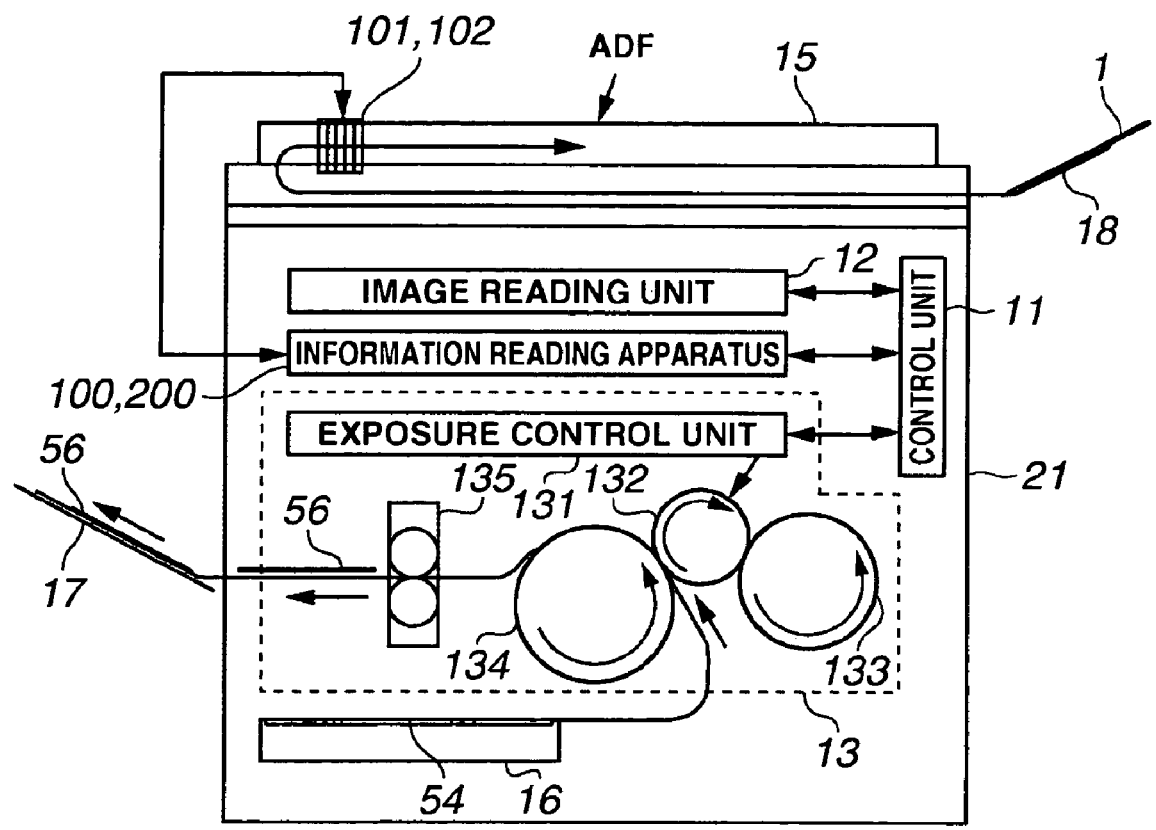
FIG. 17 is a diagram illustrating another copier 21 than the copier 20, provided with the information reading apparatus 100, 200.

The information reading apparatus 100 or 200 may be applied to a copier 21 as shown in FIG. 17, other than the copier 20.

The copier 21 is provided with an auto document feeder (ADF). The copier 21 has similar configuration to the copier 20 except that, in the copier 21, the exciting coil 101 and the sensing coil 102 are arranged within the ADF instead of in the vicinity of the paper delivery tray in the copier 20 so that the an original document conveyed by the ADF passes directly below the exciting coil 101 and the sensing coil 102. Thus, the copier 20 has similar effects to the copier 20.

In this case as well, identification information formed by a magnetic element or magnetostrictive vibrator provided in the original document can be identified, and the original document information copied by the copier 21 can be managed.

As described above, a medium provided with magnetic element, and a method and apparatus for reading information from such medium according to the present invention is configured so that the medium is provided with at least one magnetic element which generates a signal when applied with a magnetic field, together with plural pseudo elements having similar sizes and shapes to the magnetic element and generating no signal when applied with the magnetic field. This configuration makes it difficult to visually identify the identification information indicated by the magnetic elements provided in the medium and to remove the identification information from the medium. Thus, the present invention provides a medium that ensures high security.

As described above, according to an aspect of the present invention, an information reading apparatus comprises an excitation unit that applies a magnetic field to a medium provided with at least one magnetic element that generates a signal when the magnetic field is applied thereto and a pseudo element that generates no signal when the magnetic field is applied thereto; a detection unit that detects a signal when the signal is generated; and an identification unit that identifies the medium based on a result of the detecting.

According to another aspect of the present invention, the information reading apparatus may further comprises a movement control unit that causes either one or both of the excitation detector and the medium to move relatively to each other in a predetermined direction.

According to still another aspect of the present invention, an information reading method comprises providing a medium with at least one magnetic element that generates a signal when a magnetic field is applied thereto and a pseudo element that generates no signal when the magnetic field is applied thereto; applying the magnetic field to the medium; and reading information formed by the magnetic element provided in the medium when the signal generated by the magnetic element is detected.

According to even another aspect of the present invention, the information reading method may further comprises moving either one or both of the excitation detector and the medium relatively to each other in a predetermined direction; and reading information formed by the magnetic element provided in the medium when the signal generated by the magnetic element is detected.

According to yet another aspect of the present invention, a medium comprises at least one magnetic element that generates a signal when a magnetic field is applied thereto; a pseudo element that generates no signal when the magnetic field is applied thereto; wherein the magnetic element is mixed with the pseudo elements in the medium.

According to further aspect of the present invention, each magnetic element may have different length, and information for identifying the medium may be formed in correspondence with a combination of number of the magnetic elements and length of the magnetic elements.

According to still further aspect of the present invention, each magnetic element may have different magnetic properties, and the information for identifying the medium may be formed in correspondence with a combination of at least two of number, length and magnetic property of the magnetic elements.

According to even further aspect of the present invention, the signal generated by the magnetic element may be a signal generated in response to a change in magnetic flux that occurs in the magnetic element at a reversal of magnetization thereof According to yet further aspect of the present invention, the signal generated by the magnetic element may be a signal generated by magnetostrictive vibration of the magnetic element.

According to even still further aspect of the present invention, the pseudo element may have same size and shape as the magnetic element.

The forgoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-86612 filed on Mar. 24, 2005 including specification, claims, drawings and abstract is incorporated herein by reference in its entirety.

What is claimed is:

1. An information reading method comprising:
providing a medium with at least one magnetic element group having a plurality of magnetic elements each having a different length and generating a signal in response to a reversal of magnetization of the magnetic element when an alternating magnetic field is applied to the medium, and at least one camouflaging pseudo element group having the same number of camouflaging pseudo elements as that of the magnetic elements included in the magnetic element group, each of the camouflaging pseudo elements having the same length as that of the magnetic elements included in the magnetic element group and not generating the signal when the alternating magnetic field is applied to the medium, the magnetic element group and the camouflaging pseudo element group being arranged parallel to each other;
detecting, by an excitation-detection unit, the signal generated from the magnetic element group provided in the medium by applying the alternating magnetic field to the medium;
reading, by an information reading unit, information formed by the magnetic element group based on the signal detected by the excitation-detection unit; and
controlling, by a controller, a processing for copying or printing of the medium based on the information read by the information reading unit.

2. The information reading method according to claim 1, further comprising:
moving either one or both of the excitation-detection unit and the medium relative to each other in a predetermined direction; and
reading the information formed by the magnetic element group having the magnetic elements provided in the medium when the excitation-detection unit detects signals sequentially generated from the magnetic elements that are excited by the excitation-detection unit.

3. A medium comprising:
at least one magnetic element group having a plurality of magnetic elements each having a different length and generating a signal in response to a reversal of magnetization of the magnetic element when an alternating magnetic field is applied to the medium; and
at least one camouflaging pseudo element group having the same number of camouflaging pseudo elements as that of the magnetic elements included in the magnetic element group, each of the camouflaging pseudo elements having the same length as that of the magnetic elements included in the magnetic element group and not generating the signal when the alternating magnetic field is applied to the medium, the magnetic element group and the camouflaging pseudo element group being arranged parallel to each other, wherein
information formed by the magnetic element group is read based on the signal detected in correspondence with the magnetic element group and a processing for copying or printing is controlled based on the read information.

4. The medium according to claim 3, wherein
the magnetic element group forms information which identifies the medium in correspondence with a combination of number of the magnetic elements and length of the magnetic elements included in the magnetic element group.

5. An information reading apparatus comprising:
an excitation-detection unit that detects a signal generated from a magnetic element group provided in a medium by applying an alternating magnetic field to the medium, the medium being provided with at least one magnetic element group having a plurality of magnetic elements each having a different length and generating the signal in response to a reversal of magnetization of the magnetic element when the alternating magnetic field is applied to the medium, and at least one camouflaging pseudo element group having the same number of camouflaging pseudo elements as that of the magnetic elements included in the magnetic element group, each of the camouflaging pseudo elements having the same length as that of the magnetic elements included in the magnetic element group and not generating the signal when the alternating magnetic field is applied to the medium, the magnetic element group and the camouflaging pseudo element group being arranged parallel to each other,
an information reading unit that reads information formed by the magnetic element group based on the signal detected by the excitation-detection unit; and
a controller that controls a processing for copying or printing of the medium based on the information read by the information reading unit.

6. The information reading apparatus according to claim 5, further comprising:
a moving control unit that causes either one or both of the excitation-detection unit and the medium to move relatively to each other in a predetermined direction, wherein
the information reading unit reads the information formed by the magnetic element group having the magnetic elements provided in the medium when the excitation-detection unit detects signals sequentially generated from the magnetic elements that are excited by the excitation-detection unit.

7. An information reading method comprising:
providing a medium with at least one magnetic element group having a plurality of magnetic elements each having a different length and generating a signal in response to a magnetostrictive vibration of the magnetic element when an alternating magnetic field is applied to the medium, and at least one camouflaging pseudo element group having the same number of camouflaging pseudo elements as that of the magnetic elements, each of the camouflaging pseudo elements having the same length as that of the magnetic elements included in the magnetic element group and not generating the signal when the alternating magnetic field is applied to the medium, the magnetic element group and the camouflaging pseudo element group being arranged parallel to each other;

detecting, by an excitation-detection unit, the signal generated from the magnetic element group provided in the medium by applying the alternating magnetic field to the medium;

reading, by an information reading unit, information formed by the magnetic element group based on the signal detected by the excitation-detection unit; and controlling, by a controller, a processing for copying or printing of the medium based on the information read by the information reading unit.

8. The information reading method according to claim 7, further comprising:

moving either one or both of the excitation-detection unit and the medium relative to each other in a predetermined direction; and reading the information formed by the magnetic element group having the magnetic elements provided in the medium when the excitation-detection unit detects signals sequentially generated from the magnetic elements that are excited by the excitation-detection unit.

9. A medium comprising:

at least one magnetic element group having a plurality of magnetic elements each having a different length and generating a signal in response to a magnetostrictive vibration of the magnetic element when an alternating magnetic field is applied to the medium; and at least one camouflaging pseudo element group having the same number of camouflaging pseudo elements as that of the magnetic elements, each of the camouflaging pseudo elements having one of the same length as that of the magnetic elements included in the magnetic element group and not generating the signal when the alternating magnetic field is applied to the medium;

the magnetic element group and the camouflaging pseudo element group being arranged parallel to each other, wherein information formed by the magnetic element group is read based on the signal detected in correspondence with the magnetic element group and a processing for copying or printing is controlled based on the read information.

10. The medium according to claim 9, wherein the magnetic element group forms information which identifies the medium in correspondence with a combination of number of the magnetic elements and length of the magnetic elements included in the magnetic element group.

11. An information reading apparatus comprising:

an excitation-detection unit that detects a signal generated from a magnetic element group provided in a medium by applying an alternating magnetic field to the medium, the medium being provided with at least one magnetic element group having a plurality of magnetic elements each having a different length and generating the signal in response to a magnetostrictive vibration of the magnetic element when the alternating magnetic field is applied to the medium, and at least one camouflaging pseudo element group having the same number of camouflaging pseudo elements as that of the magnetic elements included in the magnetic element group, each of the camouflaging pseudo elements having the same length as that of the magnetic elements included in the magnetic element group and not generating the signal when the alternating magnetic field is applied to the medium, the magnetic element group and the camouflaging pseudo element group being arranged parallel to each other, an information reading unit that reads information formed by the magnetic element group based on the signal detected by the excitation-detection unit; and a controller that controls a processing for copying or printing of the medium based on the information read by the information reading unit.

12. The information reading apparatus according to claim 11, further comprising:

a moving control unit that causes either one or both of the excitation-detection unit and the medium to move relatively to each other in a predetermined direction, wherein the information reading unit reads the information formed by the magnetic element group having the magnetic elements provided in the medium when the excitation-detection unit detects signals sequentially generated from the magnetic elements that are excited by the excitation-detection unit.

* * * * *